(12) United States Patent
Price et al.

(10) Patent No.: US 11,352,498 B2
(45) Date of Patent: Jun. 7, 2022

(54) POLYETHERIMIDE POWDERS FOR ADDITIVE MANUFACTURING

(71) Applicant: SABIC GLOBAL TECHNOLOGIES B.V., Bergen op Zoom (NL)

(72) Inventors: Brian Gray Price, Evansville, IN (US); Elena Miloskovska, Breda (NL); Bruke Jofore, Bergen op Zoom (NL); Raul Fernandez Cabello, Bergen op Zoom (NL); Hao Gu, Bergen op Zoom (NL); Vandita Pai-Paranjape, Evansville, IN (US); Viswanathan Kalyanaraman, Newburgh, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 334 days.

(21) Appl. No.: 16/471,865

(22) PCT Filed: Dec. 22, 2017

(86) PCT No.: PCT/US2017/068228
§ 371 (c)(1),
(2) Date: Jun. 20, 2019

(87) PCT Pub. No.: WO2018/119409
PCT Pub. Date: Jun. 28, 2018

(65) Prior Publication Data
US 2020/0087513 A1 Mar. 19, 2020

Related U.S. Application Data

(60) Provisional application No. 62/438,632, filed on Dec. 23, 2016, provisional application No. 62/438,598, filed on Dec. 23, 2016, provisional application No. 62/438,669, filed on Dec. 23, 2016.

(51) Int. Cl.
*B29C 64/264* (2017.01)
*B29C 64/153* (2017.01)
(Continued)

(52) U.S. Cl.
CPC ............ *C08L 79/08* (2013.01); *B29C 64/153* (2017.08); *B29C 64/245* (2017.08);
(Continued)

(58) Field of Classification Search
CPC ..... C08L 79/08; B29C 64/153; B29C 64/245; B29C 64/264; B33Y 10/00; B33Y 70/00;
(Continued)

(56) References Cited

U.S. PATENT DOCUMENTS

| 3,383,092 A | 5/1968 | Cazier |
| 3,671,487 A | 6/1972 | Abolins |

(Continued)

FOREIGN PATENT DOCUMENTS

| WO | 2009015383 A2 | 1/2009 |
| WO | 2015157148 A1 | 10/2015 |

OTHER PUBLICATIONS

International Search Report for International Application No. PCT/US2017/068228, International Filing Date Dec. 22, 2017, dated Apr. 24, 2018, 4 pages.

(Continued)

*Primary Examiner* — Nahida Sultana
(74) *Attorney, Agent, or Firm* — Cantor Colburn LLP

(57) ABSTRACT

Provided are amorphous and at least partially crystalline polyetherimide compositions having a comparatively narrow particle size distribution and are particularly suited for additive manufacturing processes. The compositions comprise a population of polyetherimide particulates are characterized as having a zero-shear viscosity sufficiently low so as to achieve a coalescence of at least 0.5, and preferably of about 1.0, as characterized by the Frenkel model at a temperature less than 450° C.

16 Claims, 14 Drawing Sheets

(51) Int. Cl.
*B29C 64/245* (2017.01)
*B33Y 10/00* (2015.01)
*B33Y 70/00* (2020.01)
*C08L 79/08* (2006.01)

(52) U.S. Cl.
CPC ............. *B29C 64/264* (2017.08); *B33Y 10/00* (2014.12); *B33Y 70/00* (2014.12)

(58) Field of Classification Search
CPC . B29K 2879/085; C08J 2379/08; C08J 3/124; C08J 3/12; C08J 7/04; C08J 7/08
See application file for complete search history.

(56) References Cited

U.S. PATENT DOCUMENTS

| | | |
|---|---|---|
| 3,723,373 A | 3/1973 | Lucas |
| 4,550,156 A | 10/1985 | Gallagher |
| 5,521,230 A | 5/1996 | Bhatia et al. |
| 2015/0024317 A1* | 1/2015 | Orrock .................. G03G 13/22 430/108.3 |
| 2015/0031834 A1* | 1/2015 | Kobayashi ............ C08L 101/00 525/58 |
| 2015/0315725 A1* | 11/2015 | Uehata ...................... C08J 5/04 428/221 |
| 2018/0273699 A1* | 9/2018 | Kalyanaraman ........... C08J 3/14 |
| 2020/0140706 A1* | 5/2020 | Pfister .................... C08L 71/00 |

OTHER PUBLICATIONS

Written Opinion for International Application No. PCT/US2017/068228, International Filing Date Dec. 22, 2017, dated Apr. 24, 2018, 6 pages.

* cited by examiner

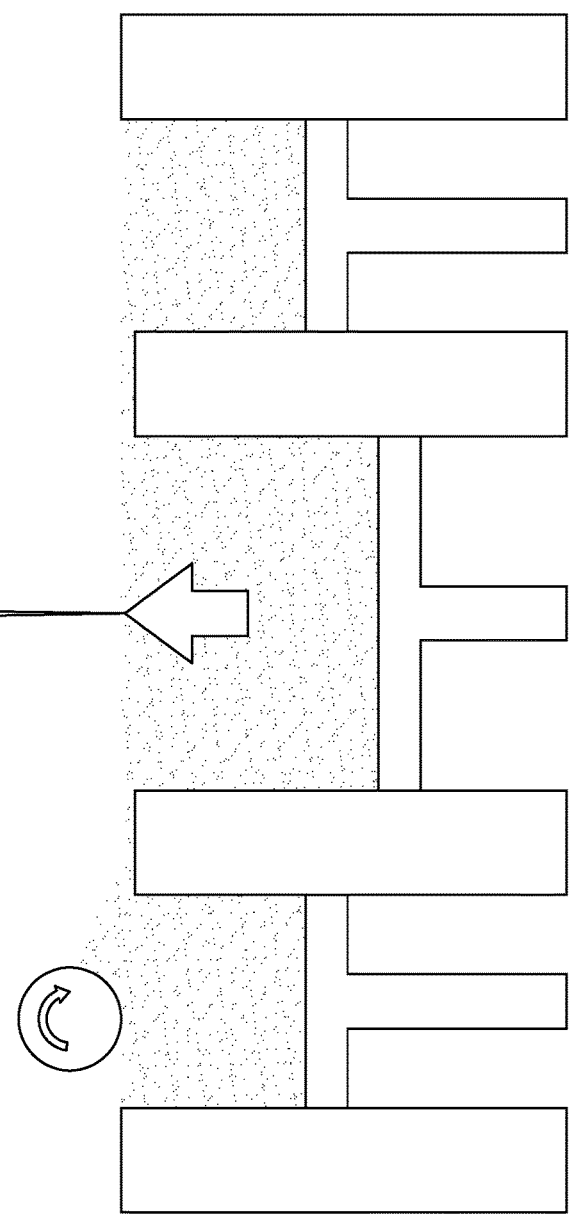

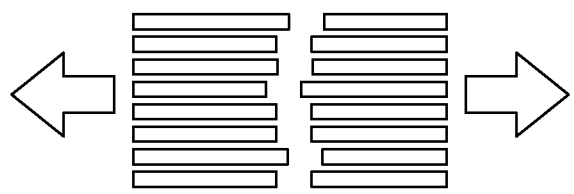
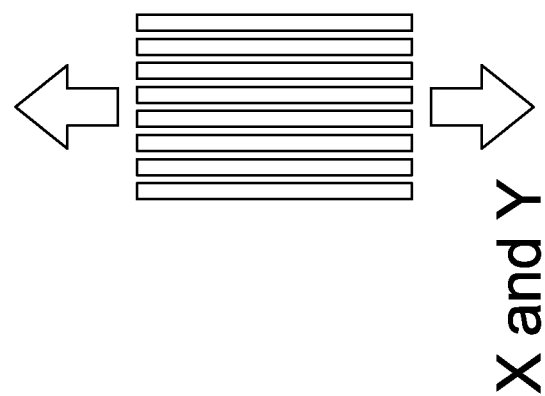
X and Y
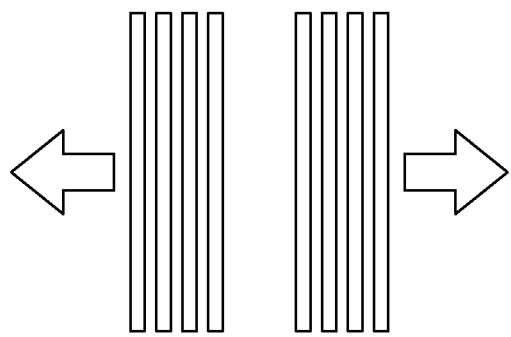
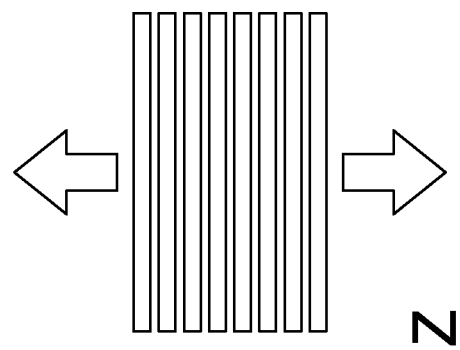
Z
FIG. 6

Table 3.

|  | Value | Unit | Value | Unit |
|---|---|---|---|---|
| MECHANICAL properties | PEI |  | Modified PEI |  |
| Tensile Modulus (ISO527) |  |  |  |  |
| X Direction | 1940 | MPa | 2227 | MPa |
| Y Direction | 1976 |  | 2686 |  |
| Tensile Strength (ISO527) |  |  |  |  |
| X Direction | 44.9 | MPa | 63.1 | MPa |
| Y Direction | 40.4 |  | 76.9 |  |
| Elongation at break (ISO527) |  |  |  |  |
| X Direction | 3.4 | % | 4.2 | % |
| Y Direction | 3 |  | 4.3 |  |
| Flexural Modulus (ISO178) |  |  |  |  |
| X Direction | 1928 | MPa | 2700 | MPa |
| Y Direction | 1900 |  | 2546 |  |
| Flexural Strength (ISO178) |  |  |  |  |
| X Direction | 85.7 | MPa | 136.9 | MPa |
| Y Direction | 79.1 |  | 119.4 |  |
| Flexural maximum strain |  |  |  |  |
| X Direction | 5.6 | % | 6.9 | % |
| Y Direction | 5.3 |  | 7.5 |  |
| PHYSICAL properties |  |  |  |  |
| Density (relative to injection molding) (ISO1183) |  |  |  |  |
| X Direction | 80 |  | 97.6 |  |
| Y Direction | 80 | % | 96 | % |
| Z Direction | 73 |  | 94 |  |

FIG. 7

Table 4

| Properties | | CRS PEI, SLS | CRS PEI, IM |
|---|---|---|---|
| Density (g/cm³) ISO1183 | X direction | 1.25 (97.6%) | 1.28 |
| | Y direction | 1.25 (97.6%) | |
| | Z direction | 1.24 (96.8%) | |
| Tensile Strength (MPa) ISO527 | X direction | 71 | 99 |
| | Y direction | 73.3 | |
| | Z direction | 18.9 | |
| Tensile Modulus (MPa) ISO527 | X direction | 2626 | 2890 |
| | Y direction | 2646 | |
| | Z direction | 1128 | |
| Elongation at Break (%) ISO527 | X direction | 5 | 60 |
| | Y direction | 5.5 | |
| | Z direction | 0.8 | |
| Flexural Strength (MPa) ISO178 | X direction | 125.9 | 137 |
| | Y direction | 121.5 | |
| | Z direction | 60.1 | |
| Flexural Modulus (MPa) ISO178 | X direction | 2371 | 3100 |
| | Y direction | 2403 | |
| | Z direction | 1847 | |
| IZOD Impact, Notched, 23C (J/m) ASTMD256 | X direction | 43 | 58 |
| | Y direction | 37 | |
| | Z direction | 25.3 | |

FIG. 12

POLYETHERIMIDE POWDERS FOR ADDITIVE MANUFACTURING

CROSS REFERENCE TO RELATED APPLICATIONS

This application is a National Stage application of PCT/US2017/068228, filed Dec. 22, 2017, which claims the benefit of U.S. Application Nos. 62/438,632, filed Dec. 23, 2016, 62/438,669, filed Dec. 23, 2016, and 62/438,598, filed Dec. 23, 2016, all of which are incorporated by reference in their entireties herein.

TECHNICAL FIELD

The present disclosure relates to the field of polyetherimide materials and to the field of additive manufacturing.

BACKGROUND

At present, there is a need for laser-sinterable polyetherimide (PEI) powder for use in additive manufacturing applications, as there is clear demand for a high temperature material with FR properties for selective laser sintering (SLS). The current predominant SLS material is polyamide-12 (PA12), but that material is not necessarily suitable for all applications, in particular applications with need for flame resistance (FR). Industries (e.g., the aerospace industry) thus have an interest in alternative additive manufacturing materials that have favorable FR characteristics. Accordingly, there is a need in the art for PEI compositions suitable for use in additive manufacturing applications.

SUMMARY

The disclosed technology provides, inter alia, laser sintering of amorphous and partially crystalline-PEI resin obtained via emulsion and grinding approaches. This material may be used to obtain three-dimensional (3D) printed parts with high densities relative to injection-molded parts, e.g., 97%, which compares favorably to the densities of parts made using polyamide-12 (PA12). The mechanical properties of parts made according to the disclosed compositions are comparable and in some cases even superior to those of PA12.

In one aspect, the present disclosure provides a composition comprising: a population of polyetherimide particulates having a Dv50 value, for equivalent spherical sizes of the population of polyetherimide particulates, of between about 10 and about 100 micrometers, preferably about 45 micrometers to about 80 micrometers; a Dv10 value, for equivalent spherical sizes of the population of polyetherimide particulates above about 1 micrometer, preferably greater than 1 micrometer to about 45 micrometers, and a Dv90 value, for equivalent spherical sizes of the population of polyetherimide particulates, below about 250 micrometers, preferably from about 80 micrometers to about 125 micrometers, the population of polyetherimide particulates optionally being essentially free of particulates less than about 1 micrometer in diameter, optionally and more preferably being essentially free of particulates less than about 5 micrometers in diameter, optionally and most preferably being essentially free of particulates less than about 10 micrometers in diameter, based on the equivalent spherical size of the polyetherimide particulates, and the polyetherimide particulates having a sphericity of greater than 0.8; and the composition optionally comprising one or more fillers, stabilizers, pigments, reinforcing agents, flame retardants, anti-drip agents, or any combination thereof.

Also provided are methods comprising placing a first layer of a composition according to the present disclosure into contact with a solidified region of a material that comprises polyetherimide; and heating a working region of the first layer so as to sinter together at least some of the particulates in the working region and so as to sinter to the solidified region at least some of the particulates in the working region.

Also provided are additively-manufactured articles, the articles being made according to the disclosed methods.

BRIEF DESCRIPTION OF THE DRAWINGS

The following figures are illustrative only and do not serve to limit the scope of the present disclosure. In the figures:

FIG. 1 provides a schematic illustration of selective laser sintering (SLS) system.

FIG. 6 provides deformation mechanisms in all three printing directions.

FIG. 7 provides mechanical data obtained for PEI and "modified" PEI as Table 3.

FIG. 12 provides exemplary results for an SLS part made with a CRS PEI prepared according to the present disclosure.

DETAILED DESCRIPTION OF ILLUSTRATIVE EMBODIMENTS

Figure 2A:
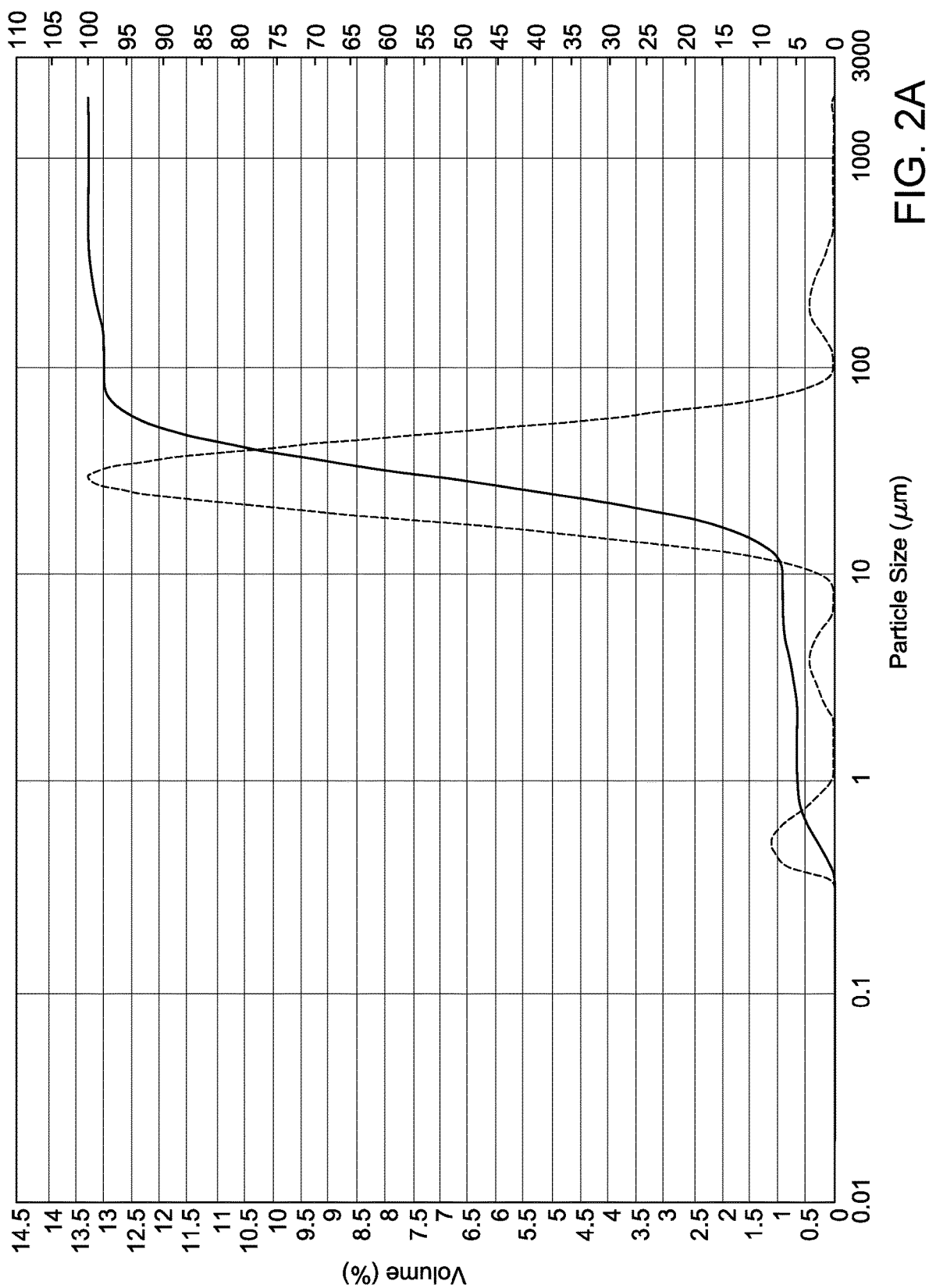
FIG. 2 provides (a) particle size distribution and (b) SEM image of a standard emulsion-made PEI powder.

Compositions of the present disclosure provide a polyetherimide (PEI) powder (comprised of particulates) for use in additive manufacturing applications. The disclosed compositions are PEI powders comprising a population of polyetherimide particulate. In various aspects, the disclosed PEI powders exhibit properties desirable for use with SLS applications in additive manufacturing. Polyetherimide powders described herein include amorphous and partially crystalline PEI and can be characterized by the secondary treatment employed. For example, PEI powders of the present disclosure are prepared via an emulsion process, induced crystallization, etc. At least partially crystalline indicates that an individual particulate of the PEI powder comprises both a crystalline region and an amorphous region.

Compositions of the present disclosure (whether partially crystalline or amorphous) are characterized as having a zero-shear viscosity sufficiently low so as to achieve a coalescence of at least 0.5, and preferably of about 1.0, as characterized by the Frenkel model at a temperature less than 450° C., i.e., the degradation temperature of PEI. In further aspects, the composition may be characterized as achieving a zero-shear viscosity of less than about $10^4$ Pa*s at a temperature below the lowest degradation temperature of any component of the composition (or less than the degradation temperature of PEI). The population distribution and resultant zero shear viscosity of the compositions of the present disclosure, when used in additive manufacturing particle-fusing methods, such as SLS, produce articles with higher densities and improved mechanical properties as compared to articles produced using other PEI powders.

PEI powders described herein are derived from polyetherimide resins formed from a dianhydride, diamine, and an end-capper. In certain aspects, the PEI resin contains units derived from the reaction of an aromatic ether dianhydride, bisphenol A dianhydride (BPADA), with an aromatic diamine (meta- or para-phenylene diamine (m-PD and p-PD)). Suitable PEI resins commercially available from SABIC include ULTEM™ CRS 5001 having a number average molecular weight (Mn) of 21,000 grams per mole (g/mol), a molecular weight (Mw) of 56,000 g/mol, and a dispersity of 2.5ULTEM™ CRS 5011, having a Mn of 19,000 g/mol, a Mw of 47,000 g/mol, and a dispersity of 2.5; ULTEM™ 1000, having a number average molecular weight (Mn) of 21,000 g/mol, a molecular weight (Mw) of 54,000 g/mol, and a dispersity of 2.5 (the product is 99.949% polyetherimide resin, 0.001% bisphenol-A impurity, and 0.0499% 1,2-dicholorobenzene impurity); ULTEM™ 1010, having a Mn of 19,000 g/mol, a Mw of 47,000 g/mol, and a dispersity of 2.9; and ULTEM™ 1040, having a Mn of 21,000 g/mol, a Mw range of 33,000 g/mol to 35,000 g/mol; and a dispersity of 2.5, as further described in U.S. Pat. No. 4,550,156 and International Publication WO 2009/015383. The CRS (chemically resistant) resins are formed from phthalic anhydride, BPADA, with an aromatic diamine p-phenylene diamine the p-monomer of phenylene diamine, while non-CRS grades, e.g., ULTEM™1000 and 1010, are formed from phthalic anhydride, BPADA, and m-phenylene diamine.

In some embodiments, the disclosed amorphous or partially crystalline polyetherimide powders are essentially free of particulates having a cross-sectional dimension of less than about 10, 9, 8, 7, 6, 5, 4, 3, 2, or even 1 micrometer, e.g., 0.9, 0.8, 0.7 0.6, 0.5, 0.4, 0.3, 0.2, or even 0.1 micrometers. The polyetherimide particulates may have a Dv50 value, for the equivalent spherical sizes of the population of ground polyetherimide particulates, of, e.g., about 40, 41, 42, 43, 44, 45, 46, 47, 48, 49, 50, 51, 52, 53, 54, 55, 56, 57, 58, 59, 60, 61, 62 63, 64, 65, 66, 67, 68, 69, 70, 71, 72, 73, 74, 75, 76, 77, 78, 79, 80, 81,81, 83, 83, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, or about 125 micrometers. A comparative, non-modified PEI powder composition had a Dv10 of 7.16 micrometers, a Dv50 of 19.90 micrometers, and a Dv90 of 42.79 micrometers. As a further example, an exemplary population of ground PEI particles had a Dv10 of 42.99 micrometers, a Dv50 of 67.64 micrometers, and a Dv90 of 104.1 micrometers. As one example, a population of partially crystalline derived PEI particles according to the present disclosure had a Dv10 of 40.08 micrometers, a Dv50 of 61.8 micrometers, and a Dv90 of 96.35 micrometers.

The population of polyetherimide particulates suitably has (a) a Dv50 value, for the equivalent spherical sizes of the population of polyetherimide particulates, of between about 10 and about 100 micrometers, preferably about 45 microns to 80 microns; (b) a Dv10 value, for the equivalent spherical sizes of the population of ground polyetherimide particulates, above about 1 micrometer, preferably greater than 1 micron to about 45 microns, and a Dv90 value, for the equivalent spherical sizes of the population of ground polyetherimide particulates, below about 250 micrometers, preferably 80 microns to 1 about 125 microns. The population of emulsion-processed polyetherimide particulates may optionally be essentially free of particulates less than about 1 micrometer in diameter, optionally and more preferably being essentially free of particulates less than about 5 micrometers in diameter, optionally and most preferably being essentially free of particulates less than about 10 micrometers in diameter, based on the equivalent spherical size of the polyetherimide particulates, and the polyetherimide particulates having a sphericity of greater than 0.7, preferably greater than 0.8, more preferably 0.9, even more preferably greater than 0.95. In some aspects, the polyetherimide particulates have a sphericity of greater than 0.8. For example, a PEI powder prepared via a grinding process may have a sphericity of greater than 0.8. A PEI powder prepared via an emulsion process may have a sphericity of greater than 0.95.

Essentially free as used herein indicate that a given component has not been introduced to the components. Or, "essentially free of" may refer to less than 0.01 wt. %, or less than about 0.01 wt. %. In yet another aspect, essentially free of can be less than 100 parts per million (ppm), or less than about 100 ppm. Essentially free can refer to an amount, if present at all, below a detectable level. Without being bound to any particular theory, equivalent spherical size may be calculated using results from light scattering (e.g., laser diffraction), from sieving, or other known methods. Mastersizer™ (Malvern Instruments) devices are suitable devices for generating equivalent spherical size values.

Compositions of the present disclosure may comprise a flow promoter. Polymeric powders do not always have sufficient powder flowability for additive manufacturing processes such as SLS because of surface forces that are dominant in the small particles, irrespective of the shape of particles. The ability of one powder to flow without a flow promoter depends on the polymer type itself and on the morphology of the formed particles during the powderization technique. A flow promoter as described herein may be present from about 0.01 wt % to about 1.0 wt. %, specifically from 0.025 wt % to 1 wt. %.

Flow promoters (which may comprise spherical nanoparticles or their aggregates) may be used to improve the powder flowability. The nanoparticles are in a typical range of less than 1 micron in size, preferably fewer than 100 nanometers (nm). As a specific example, the nanoparticles are from 10 to 25 nm. Generally, the nanoparticles need to be much smaller than particulate of the PEI powder and need to cover the surfaces of the powder particulate. The same flow promotors in a micron-range or larger size would not be useful as a flow promoter. When dispersed, these flow promotors cover the surface of the micrometer-sized polymer particles, disrupt the Van der Waals attraction forces between the particles, and enable the particles to flow easily thereby improving the powder flow. For exemplary experiments, PEI powders with a silica or alumina based flow promoter (e.g., 0.05%-0.2%, or depending upon the PEI derived source, 0.025 wt. % to about 1 wt. %, in weight with respect to polymer weight) were mixed in a high shear mixer (2000 rpm for 15-20 minutes) in order to break down the agglomerates of the flow-promoter and provide homogeneous dispersion of the flow promoter particles onto the polymer particles.

Exemplary flow promoters comprise comprises a metal oxide, preferably fumed silica, fumed aluminum oxide, a hydrated silica, amorphous alumina, a glassy silica, a glassy phosphate, a glassy borate, a glassy oxide, titania, talc, mica, a fumed silica, precipitated silica, kaolin, attapulgite, calcium silicate, alumina, magnesium silicate, or a combination comprising at least one of the foregoing, more preferably fumed silica, alumina, or any combination thereof. In one example, the flow promoter comprises silane and trimethoxyoctyl-reaction products with aluminum oxide.

It should be understood that the disclosed compositions may include additional additives and/or components. A composition may optionally comprise one or more fillers, stabilizers, flow promoters, pigments, reinforcing agents, flame retardants, anti-drip agents, or any combination thereof. For example, polyetherimide compositions can further optionally comprise a filler, including a reinforcing filler, a particulate filler, a nanofiller, or a combination thereof. The filler can be a reinforcing filler, for example, a flat, plate-like, and/or fibrous filler. Typically, the flat, plate-like filler has a length and width at least ten times greater than its thickness, where the thickness is from 1 to 200 micrometers. Exemplary reinforcing fillers of this type include glass flakes, mica, flaked silicon carbide, aluminum diboride, aluminum flakes, and steel flakes; wollastonite including surface-treated wollastonite; calcium carbonate including chalk, limestone, marble and synthetic, precipitated calcium carbonates, generally in the form of ground particulates; talc, including fibrous, modular, needle shaped, and lamellar talc; kaolin, including hard, soft, calcined kaolin, and kaolin comprising various coatings known in the art to facilitate compatibility with the polymeric matrix polymer; mica; and feldspar. Exemplary reinforcing fillers also include fibrous fillers such as short inorganic fibers, natural mineral fibrous fillers, single crystal fibers, glass fibers, ceramic fibers and organic reinforcing fibrous fillers. Short inorganic fibers include borosilicate glass, carbon fibers, and those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, including glass fibers such as E, ECR, S, and NE glasses and quartz and the like can also be used.

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical co-woven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The reinforcing fibers can have a diameter of 5 to 25 micrometers, specifically diameters of 9 to 15 micrometers. Combinations of rigid fibrous fillers with flat, plate-like fillers can be used.

In some applications, it can be desirable to treat the surface of the filler with a chemical coupling agent to improve adhesion to a thermoplastic polymer in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the polyetherimide composition can vary widely, and is that amount effective to provide the desired physical properties and flame resistance. In some instances, the reinforcing filler is present in an amount from more than 10 to 60 wt %, more specifically 15 to 40 wt %, and even more specifically 20 to 35 wt %, each based on the total weight of the composition. In an embodiment, no or substantially no reinforcing filler is present.

The polyetherimide composition can optionally comprise one or more other types of particulate fillers. Exemplary particulate fillers include silica, such as fused silica and crystalline silica; boron-nitride and boron-silicate; alumina, and magnesium oxide (or magnesia); silicate spheres; flue dust; cenospheres; aluminosilicate (armospheres); natural silica sand; quartz; quartzite; perlite; tripoli; diatomaceous earth; synthetic silica; and a combination thereof. All of the above fillers can be surface treated with silanes to improve adhesion and dispersion with the polymeric matrix polymer. When present, the amount of additional particulate filler in the polyetherimide composition can vary widely, and is that amount effective to provide the desired physical properties and flame resistance. In some instances the particulate filler is present in an amount from 1 to 80 wt %, specifically 5 to 30 wt %, more specifically 5 to 20 wt %, each based on the total weight of the composition. Alternatively, in some embodiments, our compositions do not contain appreciable amounts of fillers and in some situations, there are no detectable amounts of fillers, i.e., fillers are substantially absent or absent from the compositions. Accordingly, in some instances, the particulate filler is present in an amount from 0 wt % to an amount that is less than or equal to an amount selected from 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, and 1 wt %, each based on the total weight of the composition.

Nanofillers can be added for a variety of purposes, and are characterized as having an average longest dimension of 0.5 to 100 nanometers. Nanofillers can be derived from any of the above materials for reinforcing or particulate fillers, for example, nanofillers comprising boehmite alumina (synthetic), calcium carbonate, ceramics, carbon black, carbon nanotubes, carbon fibers, cellulose, activated clay, natural clay (mined, refined, and treated), synthetic clay, organoclays, natural fibers, gold, graphites, kaolins, magnesium hydroxide, mica, montmorillonite clay, polyorganosilsesquioxanes (POSS), silica, silver, talc, organotitanates, titania, wollastonite, zinc oxide, organozirconates, and zirconia. A combination of the foregoing can be used. In some instances the nanofiller is present in an amount from 0.1 to 50 wt %, specifically 1 to 30 wt %, more specifically 1 to 20 wt %, each based on the total weight of the composition. Alternatively, in some embodiments, our compositions do not contain appreciable amounts of nanofillers and in some situations, there are no detectable amounts of fillers, i.e., fillers are substantially absent or absent from the compositions. Accordingly, in some instances, the nanofiller is present in an amount from 0 wt % to an amount that is less than or equal 50 wt %, 45 wt %, 40 wt %, 35 wt %, 30 wt %, 25 wt %, 20 wt %, 15 wt %, 10 wt %, 5 wt %, and 1 wt %, each based on the total weight of the composition.

The polyetherimide compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. Combinations of additives can be used, for example, a combination of a heat stabilizer, a mold release agent, and optionally an ultraviolet light stabilizer. In general, the additives are used in the amounts generally known to be effective. The foregoing additives (except any fillers) are generally present in an amount from 0.005 to 20 wt %, specifically 0.01 to 10 wt %, based on the total weight of the composition. Alternatively, in some embodiments, our compositions do not contain appreciable amounts of additives, and in some situations, there are no detectable amounts of additives, i.e., additives are substantially absent or absent from the compositions. Accordingly, the foregoing additives (except any fillers) can be present in an amount from 0 to less than or equal to an amount selected from 20 wt %, 19 wt % 18 wt %, 17 wt %, 16 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, and 0.0001 wt %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

Suitable antioxidants can be compounds such as phosphites, phosphonites and hindered phenols or mixtures thereof. Phosphorus-containing stabilizers including triaryl phosphites and aryl phosphonates are useful additives. Di-functional phosphorus containing compounds can also be unseeded. Preferred stabilizers can have a molecular weight greater than or equal to 300 g/mole. Some exemplary compounds are tris-di-tert-butylphenyl phosphite available from Ciba Chemical Co. as IRGAFOS™ 168 and bis(2,4-dicumylphenyl)pentaerythritol diphosphite available commercially from Dover Chemical Co. as DOVERPHOS™ S-9228.

Examples of phosphites and phosphonites include: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol tri-phosphite, tetrakis(2,4-di-tert-butyl-phenyl) 4,4'-biphenylene diphosphonite, bis(2,4-di-tert-butyl-6-methylphenyl) methyl phosphite, bis(2,4-di-tert-butyl-6-methylphenyl) ethyl phosphite, 2,2',2"-nitrilo[triethyl tris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphiran-e.

Combinations comprising more than one organophosphorous compound are contemplated. When used in combination, the organo phosphorous compounds can be of the same type or different types. For example, a combination can comprise two phosphites or a combination can comprise a phosphite and a phosphonite. In some embodiments, phosphorus-containing stabilizers with a molecular weight greater than or equal to 300 g/mole are useful. Phosphorus-containing stabilizers, for example an aryl phosphite, are usually present in the composition in an amount from 0.005 to 3 wt %, specifically 0.01 to 1.0 wt %, based on total weight of the composition.

Hindered phenols can also be used as antioxidants, for example, alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane-, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphe-nyl]terephthalate, 1,1-bis-(3,5-dimethyl-2-hydroxyphenyl)butane, 2,2-bis-(3,5-di-tert-butyl-4-hydroxyphenyl) propane, 2,2-bis-(5-tert-butyl-4-hydroxy-2-methylphenyl)-4-n-dodecylmercaptobutane-, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example, greater than or equal to 300 deg. C. Hindered phenol stabilizers, are usually present in the composition in an amount from 0.005 to 2 wt %, specifically 0.01 to 1.0 wt %, based on total weight of the composition.

Plasticizers, lubricants, and mold release agents can be included. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, i.e., methyl stearate and polyethylene-polypropylene glycol copolymer in a suitable solvent; waxes such as beeswax, montan wax, paraffin wax, or the like.

In particular, an optional polyolefin can be added to modify the chemical resistance characteristics and mold release characteristics of the composition. Homopolymers such as polyethylene, polypropylene, polybutene can be used either separately or in combination. Polyethylene can be added as high-density polyethylene (HDPE), low-density polyethylene (LDPE), or a branched polyethylene. Polyolefins can also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing. When present, the polyolefin, in particular HDPET, is used in an amount from more than 0 to 10 wt %, specifically 0.1 to 8 wt %, more specifically from 0.5 to 5 wt %, all based on the total weight of the composition.

In some embodiments, the polyetherimide compositions can further include at least one additional polymer, which may be present as a copolymer or a blend. Examples of such additional polymers include and are not limited to a siloxane-polyetherimide copolymer, PPSU (polyphenylene sulfone), polyetherimides, PSU (polysulfone), PPET (polyphenylene ether), PFA (perfluoroalkoxy alkane), MFA (copolymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole) and PAI (poly(amide-imide)), poly(ether sulfone), poly(aryl sulfone), polyphenylenes, polybenzoxazoles, polybenzthiazoles, as well as blends and co-polymers thereof. Additional polymers include polyimides, polyimide co-polymers, polyphenylene oxides, polycarbonates, polysiloxane-polycarbonate copolymers, (isophthalate-terephthalate-resorcinol)-carbonate copolymers, resorcinol based silicone aryl polyester carbonate copolymers, polyesters (for example, polyethylene terephthalate, polybutylene terephthalate, polycyclohexylmethylene terephthalate, and the like). When present, an additional polymer may be present in an amount of from more than 0 up to about 60 wt %, specifically 0.1 to 15 wt %, more specifically from 0.5 to 10 wt %, all based on the total weight of the composition. In an embodiment, no polymer other than the polyetherimide as described herein is present in the composition.

Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as sodium carbonate $Na_2CO_3$, potassium carbonate $K_2CO_3$, magnesium carbonate $MgCO_3$, calcium carbonate $CaCO_3$, and barium carbonate $BaCO_3$ or fluoro-anion complex such as trilithium aluminum hexafluoride $Li_3AlF_6$, barium silicon fluoride $BaSiF_6$, potassium tetrafluoroborate $KBF_4$, tripotassium aluminum hexafluoride $K_3AlF_6$, potassium aluminum fluoride $KAlF_4$, potassium silicofluoride $K_2SiF_6$, and/or sodium aluminum hexafluoride $Na_3AlF_6$ or the like. Rimar salt and KSS and NATS (sodium toluene sulfonic acid), alone or in combination with other flame retardants, are particularly useful in the compositions disclosed herein. In certain embodiments, the flame retardant does not contain bromine or chlorine.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt %, specifically 0 to 5 wt %, based on the total weight of the composition. In some instances, where improved impact is desired, pigments such as titanium dioxide will have a mean particle size of less than 5 microns.

The polyetherimide compositions can also optionally include a fluoropolymer in an effective amount to provide anti-drip or other beneficial properties to the polymer composition. In one instance, the fluoropolymer is present in an amount 0.01 to 5.0 wt % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$, and $CF_3CF=CH_2$.

Copolymers comprising structural units derived from two or more fluorinated alpha-olefin monomers can also be used, for example, poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene) homopolymer (PTFE) preferred.

The fluoropolymer can be pre-blended in some manner with a polymer such as an aromatic polycarbonate or polyimide polymer. For example, an aqueous dispersion of fluoropolymer and a polycarbonate polymer can be steam precipitated to form a fluoropolymer concentrate for use as a drip inhibitor additive in thermoplastic polymer compositions, as disclosed, for example, in U.S. Pat. No. 5,521,230. Alternatively, the fluoropolymer can be encapsulated.

In some instances it is desired to have polyetherimide compositions that are essentially free of bromine and chlorine. "Essentially free" of bromine and chlorine means that the composition has less than 3 wt % of bromine and chlorine, and in other embodiments, less than 1 wt % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen ppm by weight of the total composition. The amount of halogen can be determined by ordinary chemical analysis such as atomic absorption.

In some embodiments, the disclosed compositions may include one or more materials that enhance the infrared or other light absorption properties of the composition. Such materials may be termed "Radiation Absorbing Materials" (RAM). RAM may be dark-colored, though this is not a requirement. For example, the composition can include as RAM one or more heat absorbers or even dark-colored materials (e.g., carbon black, carbon nanotubes, or carbon fibers). Dyes are one type of RAM, but the RAM need not be a dye. In some embodiments, the RAM and illumination source are selected such that the a, max of the RAM (i.e., the maximum wavelength absorbed by the RAM) is within about 50, 45, 40, 35, 30, 25, 20, 15, 10, or even about 5 nm of the illumination emitted from the source. Suitable illumination sources (whether used with RAM-containing materials or materials that are free of RAM) include, e.g., lasers, infrared (IR) (short, medium, and long-wave) sources, and the like.

The disclosed compositions may also include one or more RAMs. (A RAM may have a λ max of from about 200 to about 2500 nm, e.g., from about 300 to about 2400, from about 400 to about 2000, from about 500 to about 1500, from about 600 to about 1200, from about 800 to about 1100, or even at around 1100 nm. A RAM may be selected such that the RAM has a λ max in the visible light range (e.g., from about 380 to about 800 nm and all intermediate values), in the IR-A short wave range (e.g., from about 800 nm to about 1400 nm and all intermediate values), in the IR-B medium wave range (e.g., from about 1400 to about 3000 nm and all intermediate values). In some embodiments, the RAM may have a λ max in the IR-C long wave range (e.g., from about 3000 nm to about 10000 nm and all intermediate values).

A RAM may be present at, e.g., from about 0.0001 to about 1 wt % (e.g., from about 0.001 to about 0.1 wt %) of the composition. A RAM may have a λ max (i.e., the maximum wavelength absorbed by the RAM) of from, e.g., 300 to about 1000 nm, from about 350 to about 950 nm, from about 400 to about 900 nm, from about 450 to about 850 nm, from about 400 to about 800 nm, from about 450 nm to about 750 nm, from about 500 nm to about 700 nm, from about 550 nm to about 650 nm, or even about 600 nm. Exemplary, non-limiting RAMs include dyes, e.g., Disperse Black 9™ (λ max of 461 nm), Disperse Orange™ (λ max of 457 nm), and the like.

Suitable additive manufacturing processes include those processes that use filaments, pellets, and the like, and suitable processes will be known to those of ordinary skill in the art; the disclosed compositions may be used in virtually any additive manufacturing process that uses filament or pellet build material.

Additive manufacturing processes include, but are not limited to, powder bed additive manufacturing and powder fed additive manufacturing processes such as by using lasers or electron beams for iteratively fusing together the powder material. Additive manufacturing processes can include, for example, three dimensional printing, laser-net-shape manufacturing, selective laser sintering (SLS), plasma transferred arc, freeform fabrication, high speed sintering, and jet fusion techniques (such as MultiJet Fusion), and the like. These processes may be described as additive manufacturing fusing processes. One exemplary type of additive manufacturing process uses a laser beam to fuse (e.g., sinter or melt) a powder material (e.g., using a powder bed process). Another exemplary type of additive manufacturing can comprise iteratively binding together a plurality of layers of additive material using a binder to produce a green state additively manufactured component, wherein the binder can be subsequently burned off. Additive manufacturing processes can employ powder materials or wire as a raw material. Moreover additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially fused (e.g., sintered or melted) to solidify the layer.

An additive manufacturing method may comprise depositing a first layer of a composition comprising the disclosed PEI powder at a working area. At least a selected portion of the first layer may be irradiated. At least a second layer of the composition may be deposited at the selected portion of the first layer to fuse together at least some of the particulates in the selected portion with the second layer. The irradiating the selected portion of the first layer heats at least the selected portion to the melting onset temperature of the composition. The irradiating may be effected such that the composition attains a zero shear viscosity of about $10^4$ Pa·s or less.

A further exemplary additive manufacturing method may comprise placing a first layer of a composition according to the present disclosure into contact with a solidified region of a material that comprises polyetherimide; and illuminating a working region of the first layer so as to sinter together at least some of the particulates in the working region and so as to sinter to the solidified region at least some of the particulates in the working region. A second layer of a composition according to the present disclosure may be placed into contact with the first layer. A working region of the second layer can be illuminated to sinter together at least some of the particulates in the working region and so as to sinter to the first layer at least some of the particulates in the working region.

Illumination may be supplied by a variety of sources. Illumination may be supplied by a laser, a source of infrared (near or far) light, ultraviolet light, and the like. Lasers are considered particularly suitable. A user may employ a mask or other shielding to screen a part of a composition from the illumination. Infrared sources (or other energy sources) may be used to heat the deposited powder to a temperature that approaches the melting temperature ($T_m$) of the powder. The powder bed (i.e., the powder in the building area) temperature is increased to a temperature which is below (or even just below) the onset of melting $T_m$ of the powder (for some suitable materials PEI, this may be about 245° C.).

Any additive manufacturing process can be used, provided that the process allows formation of at least one layer of a thermoplastic material that is fusible to the next adjacent layer. The plurality of layers in the predetermined pattern are fused to provide the article. Any method effective to fuse the plurality of layers during additive manufacturing can be used. In some embodiments, the fusing occurs during formation of each of the layers. In some embodiments, the fusing occurs while subsequent layers are formed, or after all layers are formed.

In some embodiments, an additive manufacturing technique known generally as material extrusion can be used. In material extrusion, an article can be formed by dispensing a material ("the build material", which may be rendered flowable) in a layer-by-layer manner and fusing the layers. "Fusing" as used herein includes the chemical or physical interlocking of the individual layers, and provides a "build structure." Flowable build material can be rendered flowable by dissolving or suspending the material in a solvent. In other embodiments, the flowable material can be rendered flowable by melting. In other embodiments, a flowable prepolymer composition that can be cross-linked or otherwise reacted to form a solid can be used. Fusing can be by removal of the solvent, cooling of the melted material, or reaction of the prepolymer composition.

In particular, an article can be formed from a three-dimensional digital representation of the article by depositing the flowable material as one or more roads on a substrate in an x-y plane to form the layer. The position of the dispenser (e.g., a nozzle, extruder, filament dispenser) relative to the substrate is then incremented along a z-axis (perpendicular to the x-y plane), and the process is then repeated to form an article from the digital representation. The dispensed material is thus also referred to as a "modeling material" as well as a "build material." In some embodiments a support material as is known in the art can optionally be used to form a support structure. In these embodiments, the build material and the support material can be selectively dispensed during manufacture of the article to provide the article and a support structure. The support material can be present in the form of a support structure, for example, a scaffolding that can be mechanically removed or washed away when the layering process is completed to the desired degree. The dispenser may be movable in one, two, or three dimensions, and may also be rotatable. Similarly, the substrate may also be moveable in one, two, or three dimensions, and may also be rotatable.

EXEMPLARY EMBODIMENTS

Section A: PEI Powder Prepared Via an Emulsion Process.

Aspects of the present disclosure relate to PEI prepared according to an emulsion polymerization process. As an example, methods of forming an emulsion PEI are described herein. PEI pellets are dissolved in dichloromethane (DCM) and the obtained PEI-DCM solution is mixed with a surfactant solution (sodium dodecylbenzenesulfonate, SDBS (surfactant)/water at ratio of 0.25%) heated to 60° C. Mixing occurs at high speed (about 5000 revolutions per minute rpm and forms spherical particles stabilized by the surfactant residing on the particulate surface. The obtained PEI particulate are filtered and washed with demineralized water to remove the surfactant and any remaining solvent (residual surfactant in PEI powder was less than about 10 parts per million, ppm). The filtered particulate (i.e., emulsified PEI powder) is dried in a vacuum oven for 4 hours at 150° C. to remove any remaining solvent. Before filtration, a sample is taken to check the particle size distribution (PSD) and the process may be adjusted to try to achieve the desired particle size distribution.

Exemplary steps of emulsion modification to PEI include suspending amorphous PEI granules in solvent (e.g., DCM) and adding a surfactant in water, mixing the combination, removing the solvent, filtering, washing, and drying, and collecting the resultant PEI powder.

The 'modified' PEI powder differs from PEI powder prepared via the emulsion process with respect to its narrow PSD and, in some embodiments, having particles no smaller than 10 micrometers (microns, μm). To provide the modified PEI powder, PEI powder prepared via an emulsion process are subjected to a post process of particle size exclusion. That is, a screening process is performed on the PEI powder to exclude particles smaller than 10 microns. PEI powder prepared via an emulsion was subjected to several separation steps. Through a novel method, the particulate were separated according to their different particle size and collected as needed. This enabled preparation of the modified PEI powder having a comparatively narrow PSD (10-80 μm) and free of submicron particles (i.e., particles smaller than 10 μm). Materials are shown in Table 1.

TABLE 1

Physical properties of PEI and 'Modified' PEI obtained via emulsion

| | Tg [° C.] | Mw | Particle shape | Powderization method | D50 [μm] | Degradation temperature ($T_{deg}$) [° C.] |
|---|---|---|---|---|---|---|
| PEI | 217 | 55000 | spherical | emulsion | 15 | 450 |
| PEI ('modified') | 217 | 55000 | spherical | emulsion (post processed) | 35 | 450 |

$T_{deg}$ above was measured using a combination of thermogravimetric analysis (TGA) and hot stage microscopy and it determines the ultimate degradation temperature of the polymer powder when the polymer begins to change color and degrade (decrease in Mw). $T_{deg}$ refers to the degradation temperature is the temperature (or temperature range) at which components of the polymer chain can begin to be broken.

Hot Stage Microscopy

Hot stage microscopy measurements were performed with an Olympus BX60 compound microscope. The hot stage microscopy experiments together with TGA data may be used to identify the onset of degradation for the samples up on heating. Samples are heated to a fixed temperature corresponding to the bed temperature, typically the $T_g$ for amorphous PEI or about 245° C. for partially crystalline PEI. Heating is performed so the temperature is consistent or uniform throughout the sample. For the study of coalescence of particles, a heating rate of 100° C./minute (close to the actual heating phenomena in laser sintering) was used, whereas for identifying the onset of degradation of the polymer, a different heating rate of 10° C./minute was applied until a maximum temperature of 500° C.

Particle Size Distribution (PSD)

Laser diffraction analysis was based on the Fraunhofer diffraction theory, stating that the intensity of light scattered by a particle is directly proportional to the particle size. The angle of the laser beam and particle size have an inversely proportional relationship, where the laser beam angle increases as particle size decreases and vice versa. When measuring with a wet method the powder may be dispersed in the measurement cell by an appropriate fluid. In preparation, 2 grams (g) of powder is mixed with 10 milliliters (ml) of methanol.

Rheology

Once the PEI powder is distributed throughout the powder bed and has reached the temperatures required for SLS processing (e.g., about 220° C. for some polyetherimides), the user may wish to ensure that when the laser heats up the particles, sufficient melt flow is realized to sinter the particles together. In an SLS process, unlike the traditional processing techniques, no force other than gravity is exerted on the polymer melt. In order to achieve full fusion of the particles, the zero-shear viscosity and the surface tension should be sufficiently low. The viscosity of the material was determined from a frequency sweep rheological experiment using ARES-G2 rheometer from TA Instruments. The Carreau-Yasuda model is used to fit the frequency sweep data to determine the zero-shear viscosity.

Sintering and Secondary Operations

Once the amorphous polymer powder is mixed with a flow promoter, one may perform sintering in an SLS machine, as shown in FIG. 1. The powder bed temperature may be increased to a temperature that is just below the glass transition temperature ($T_g$) of the PEI. After one layer of powder is sintered, the powder bed piston is lowered with a predetermined increment (typically (about) 100 μm), and another layer of powder is spread over the previous sintered layer by a roller. The process then repeats as the laser melts and fuses each successive layer to the previous layer until the entire part is completed. The region, un-scanned by laser beam, acts as a natural support for any detached or overhanging features of the product.

After cooling-down of the building chamber, the parts and the surrounding material, collectively known as the "part cake", are removed from the machine. Parts are removed from the part cake and the loose powder is either brushed off or bead-blasted. Unfused powder can be sieved and reused for subsequent SLS work.

Addition of Flow Promoter for Improving Powder Flow

PEI powder and silica or alumina based flow promoter (e.g., 0.05%-0.2%, or depending upon the PEI powder preparation process, 0.025 wt. % to about 1 wt. %, in weight with respect to polymer weight) were mixed in a high shear mixer (2000 rpm for 15-20 minutes) in order to break down the agglomerates of the flow-promoter and provide homogeneous dispersion of the flow promoter particles onto the polymer particles.

PSD of PEI Amorphous Powders

Figure 2B:
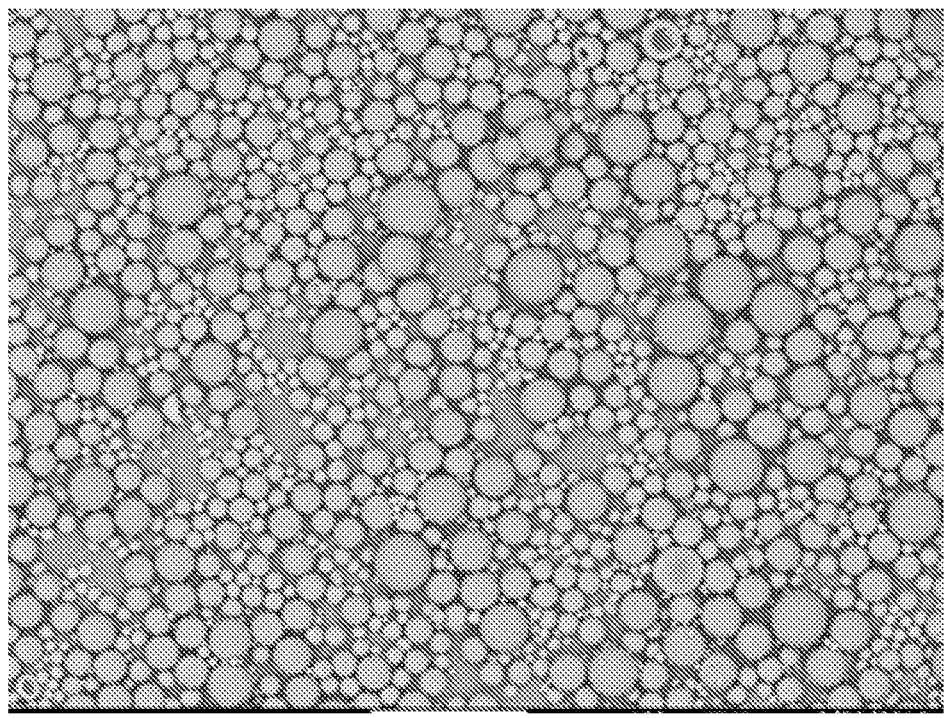
Figure 3A:
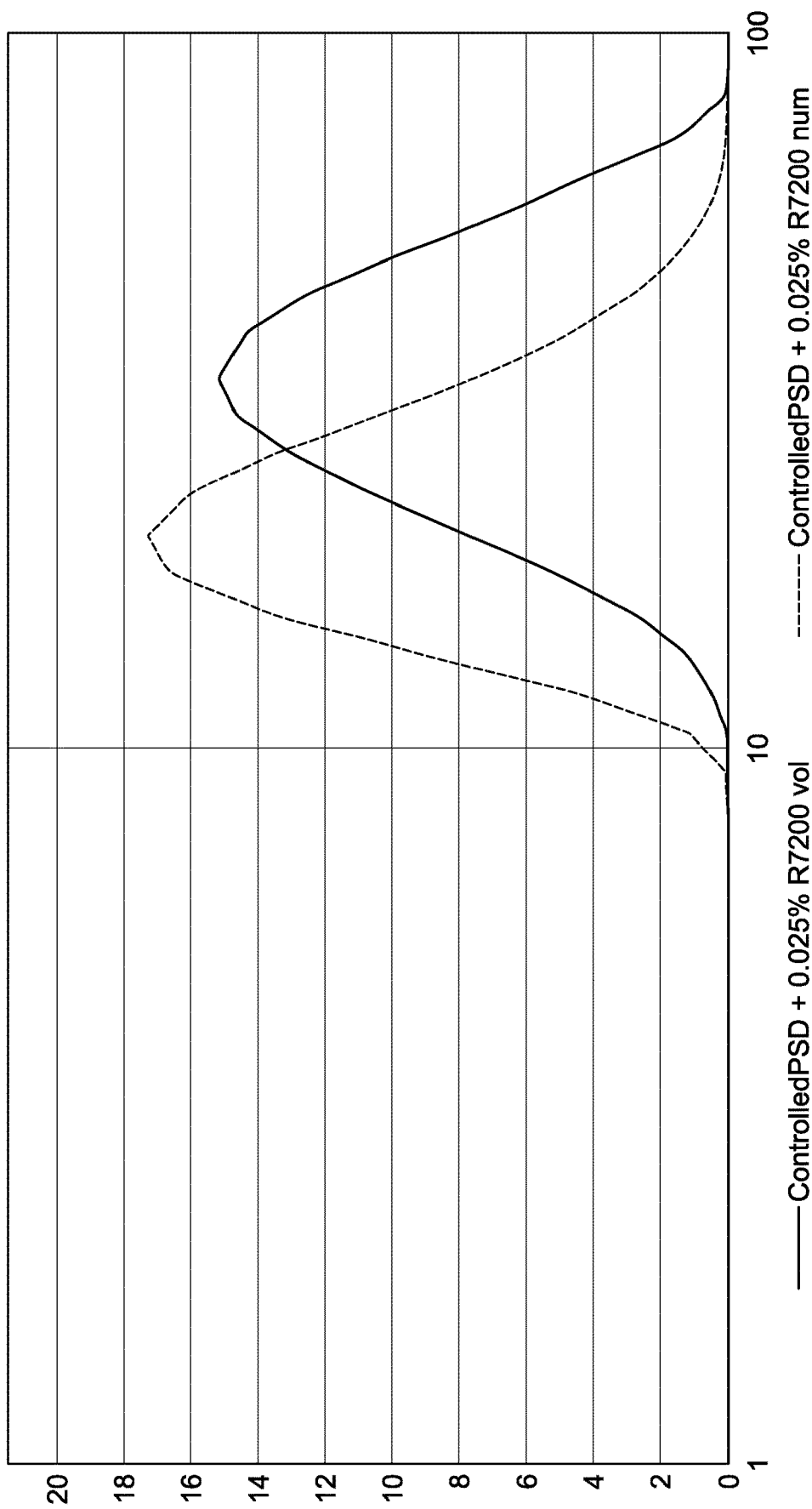
FIG. 3 provides (a) PSD and (b) SEM of an exemplary PEI obtained via an emulsion approach according to the present disclosure.
Figure 3B:
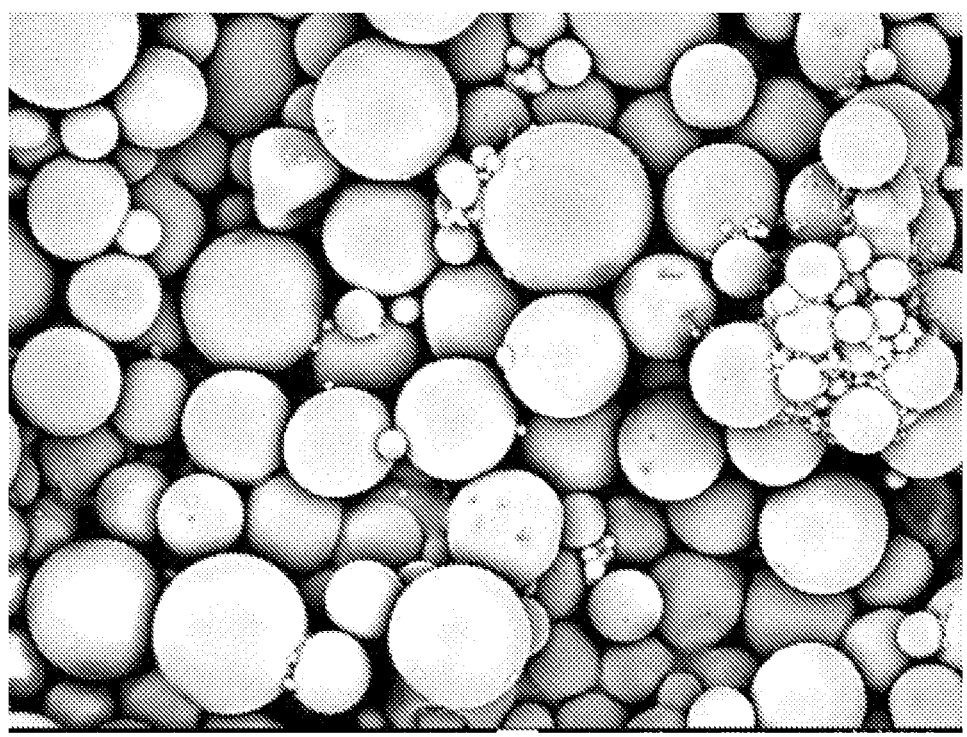

FIG. 2A presents the PSD of a standard emulsion-made PEI powder. FIG. 2B. is a scanning electron microscope SEM (image) of the same. FIG. 3A is the PSD of a modified PEI powder obtained via an emulsion approach. FIG. 3B is the SEM of the same powders. The scanning electron microscope (SEM) image presented in FIGS. 2B and 3B shows the spherical shape of the powder. The SEM image and PSD curve (FIGS. 2A-2B) indicate relatively broad PSD with D50 of 15 micrometers (μm) and a population that includes particulates smaller than 1 micron and larger than 100 microns. Processing this powder to provide a "modified PEI" powder eliminates small particles (smaller than 10 μm) and yields a narrower particle size distribution in the range of 10-100 μm. Processing of the powder may refer to processes configured to separate the particulate according to their size. As shown in FIGS. 3A-3B, small particles are generally absent and more uniform in size, which presents an advantage for the sintering step and the density of the printed 3D parts.

DSC of Amorphous PEI Powder Prepared Via Emulsion Process

Figure 4:
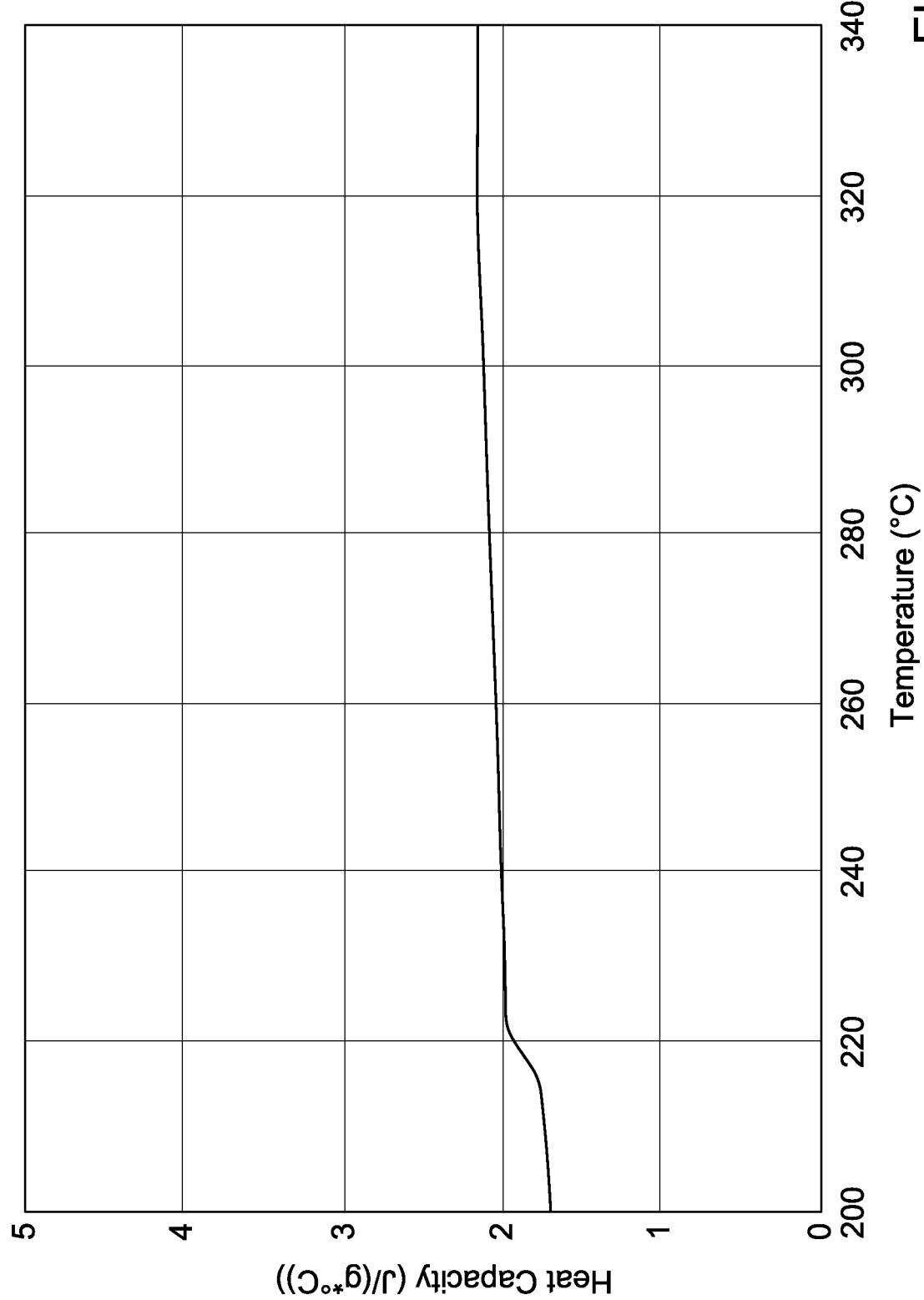
FIG. 4 provides an exemplary DSC curve of an exemplary PEI showing a glass transition at a temperature close to 220° C.

Solid-melt transitions can be measured and visualized with differential scanning calorimetry (DSC). As presented in FIG. 4, the amorphous PEI powder shows a melting range after which the material possesses low flow characteristics close to the glass transition temperature $T_g$, 217° C.

Mechanical Properties & Morphology of 3D Printed Parts

Mechanical properties of 3D printed parts are important in the area of rapid manufacturing where the stiffness, strength, and surface finish must be sufficient to meet in-service loading and operation requirements. These mechanical properties are not solely controlled by the base material itself, as the properties are also significantly influenced by the production process. Influencing factors include: laser power, scan spacing (the distance between two laser scan lines when sintering an area), laser speed, bed temperature, and (particularly) the printing direction (x, y and z). Knowledge of the relationship between SLS parameter settings and material properties enables one to manufacture parts with predetermined properties, customized for various applications.

Printing Direction x, y and z

Figure 5:
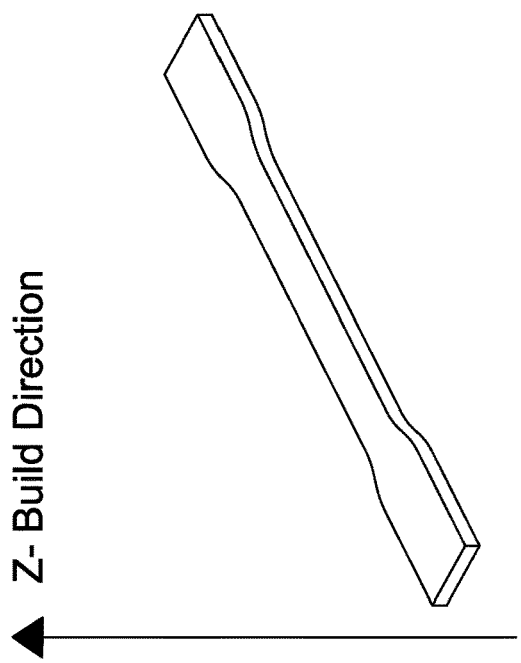
FIG. 5 provides additive manufactured parts in the X, Y and Z printing directions.

Print orientation may impact the mechanical performance of the part and especially on the strength of the part. One must consider this effect when designing a 3D printed part for a particular tensile load. FIG. 5 demonstrates the three directions that the 3D printed test can be oriented during the sintering process.

The build direction arrow indicates the direction in which layers of build material were stacked during the build process. For reference, the "Y-direction" specimen has the fewest layers, where the "Z-direction" specimen has the most layers. The direction is especially important when the part needs to sustain a particular tensile load. When pulling a tensile test specimen in the same direction that the cross-sectional layers were stacked (Z direction), the samples exhibit low strength. However, when pulled along the path of the tool head deposition (X or Y directions), the sample may exhibit much greater strength before fracture.

FIG. 6 explains the mechanism behind the fracture of the samples printed in different direction and the reasoning behind their impact on the mechanical performance. The left image shows the break behavior for specimens built in the Z-direction, where separation occurs at the interface between two stacked layers. In this build direction, the interlayer adhesion plays a crucial role during the loading and the adhesion strength will reflect on the overall mechanical performance. The right image shows that pulling a part along the (X and Y directions) requires fracture of many individual layers and since parts in y directions exhibit more layers than in x direction we might expect slight variation in the mechanical performance between x and y. As a result, of the printing direction and the applied load the printed parts will exhibit anisotropic mechanical properties, the degree of which will depend from the density obtained during the sintering and the interlayer adhesion. One might expect much higher anisotropy in highly porous parts (low density, visible layer structure in 3D parts) than in low porosity part (high density, no layer structure in 3D printed parts).

Discussion of Results from Mechanical Testing

Tensile and impact bars were prepared according to the ASTMD256 (Z-direction) and ISO 180 standard (X, Y direction). The two different materials were considered for comparing their mechanical performance and the 3D printed samples obtained from each were built in x, y and z orientation in order to assess the variations in mechanical properties between each orientation and thereby understand the degree of anisotropy for the selected PEI material. For samples in x, y direction tensile and flex data were obtained while for the test samples in z-direction only flex data. The sintering conditions (being the second most important factor after the powder properties that can significantly influence the mechanical performance of the 3D printed parts) were configured according to the best sintering parameters per material to achieve the highest density in the printed 3D parts (see Table 2 herein).

As described, the density of the 3D printed parts correlates well with the mechanical performance of the parts at least in x, y direction, hence higher density 3D parts are expected to have better mechanical performance.

TABLE 2

Sintering parameters used to produce the test samples.

| Material | PEI | PEI - modified |
|---|---|---|
| SLS machine | Fraunhofer Mini | SABIC |
| Building area T (° C.) | 210 | 220 |
| Feeding area T (° C.) | 135 | 160 |
| Laser scan speed(meters per second, m/s) | 5 | 5 |
| Laser scan times | single | double |
| Laser power (watts, W) | 30 | 44 |
| Hatch distance (μm) | 100 | 100 |
| Layer thickness (μm) | 100 | 100 |
| Specimen Type | ISO 180/527 1BA | ISO180 (X, Y)/ASTM(Z) |

The results obtained from the tensile and flex analysis of the 3D printed parts in x, y direction are presented in Table 3 (shown in FIG. 7). These data suggest that the parts built in y orientation showed a slightly higher average tensile strength and modules values when compared with those built in the x orientation. One non-limiting explanation for this behavior could be in the number of layer per orientation, where x contains about 30 layers and y about 100 layers, which might result in slightly better mechanical performance for y direction.

The density of the printed parts follows a trend in that for the x and y directions, the density is approximately the same, while density for the z direction is always lower. The insufficient adhesion between the layers leading to more porous interlayer structure may lead to higher porosity. Or, the smaller area available for sintering limits the magnitude of the laser power used (higher laser power causes burning) and prevents full particle coalescence, hence higher porosity. The challenge in obtaining high density parts (greater than 95%) without sacrificing the dimensions of the printed part has been solved using the modified PEI powder with narrow PSD. Use of the modified PEI powder with narrow PSD enabled use of higher laser power and printed parts with 97% density in x, y direction and having excellent dimensional stability.

The visual inspection of the printed 3D parts reveals excellent surface appearance (i.e., no residual powder on the surface, residual powder easily removed during the sand blasting process). The edges are sharp and dimensions are within the tolerances of about 0.5 mm in the x, y and z directions. The darker color of the printed samples indicates good melt behavior during the sintering process and high density in the 3D printed parts. Unlike these samples, the samples obtained with PEI appear more white, which indicates lower density parts and more worsen surface finish with more residual powder. The elongation at break increased with the increase in density, and density (relative to injection molding) increased from 80% to 97.6% resulted in increase of about 30% for elongation at break (the average (of X&Y direction) increase is about 33%). This can also be attributed to the increase in part density as a result of good particle coalescence which can result in a reduction in material brittleness.

Figure 8:
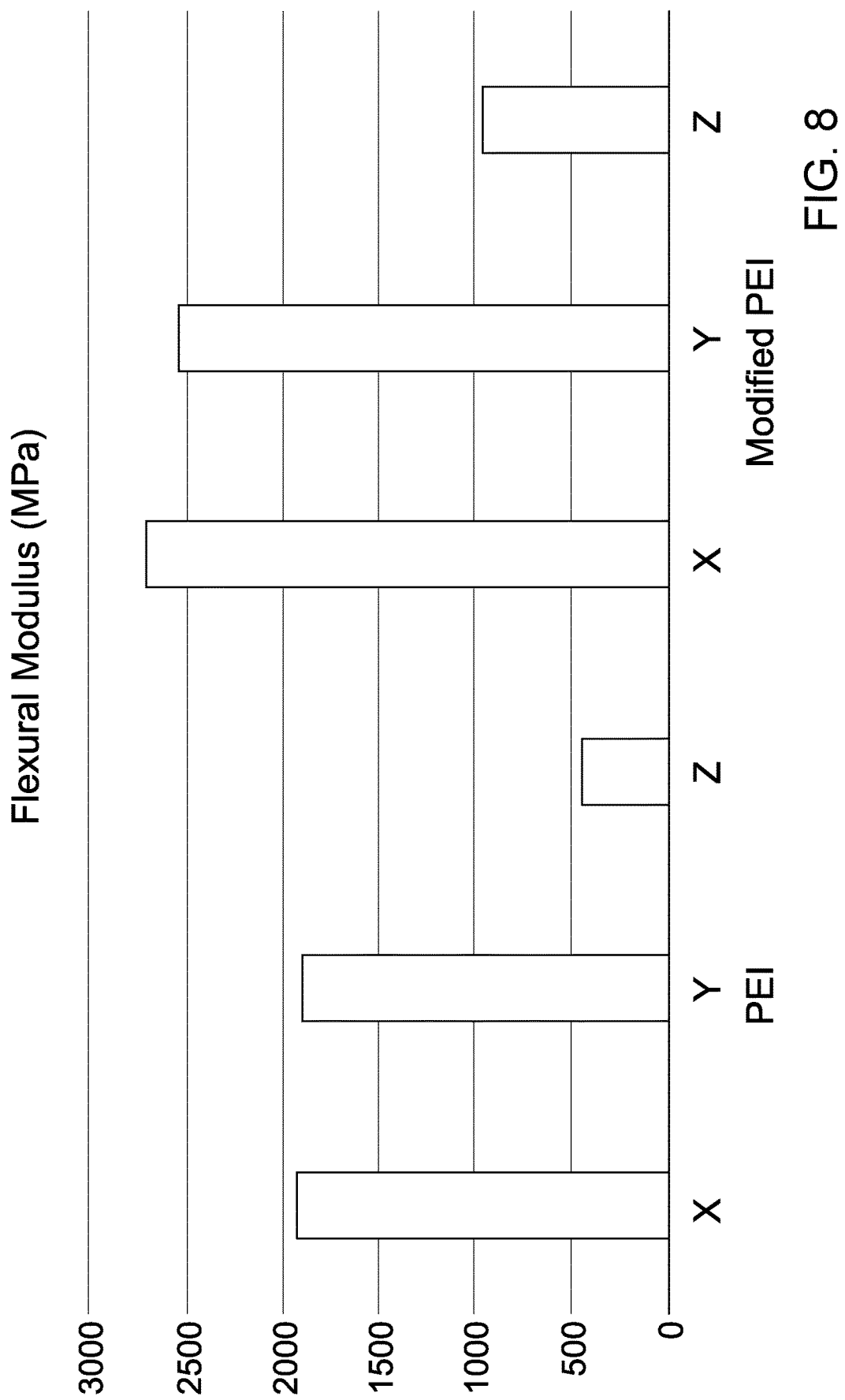
FIG. 8 provides flexural modulus of exemplary 3D printed parts in three x, y and z direction.
Figure 9:
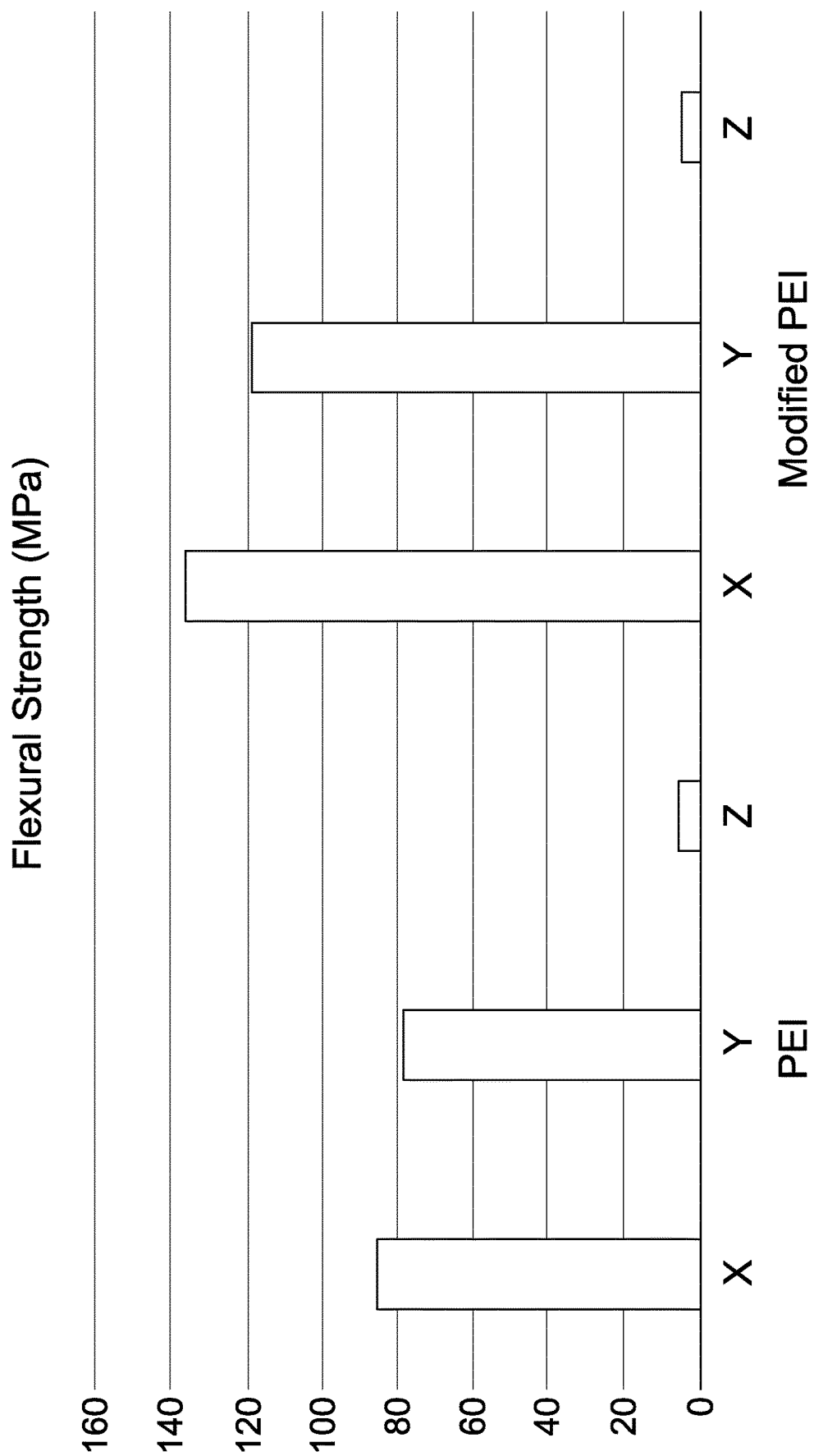
FIG. 9 provides the flexural strength of exemplary 3D printed parts in three x, y and z direction.

The results for the elongation at break with respect to variation in the build orientation for x, y show slightly better values for y direction when compared to x as observed earlier for the modules. The flexural results on the other hand, show an opposite behavior for x, y direction printed 3D parts where somewhat higher flex modules and strength were observed in the x direction. An increase in flexural modulus and strength has been achieved for the 'modified' PEI (97%), on average 40%, which is a favorable result and may, without being bound to any particular theory, be ascribed to the higher density obtained for this material, as shown in FIG. 8 and FIG. 9.

As shown in Table 3 (FIG. 7), the modified PEI powder exhibited improved mechanical properties (in nearly every category) relative to the non-modified PEI. In particular, the modified PEI powder exhibited a part density that exceeded that of the non-modified PEI powder and approached the density of injection molded PEI. One must note that the parts obtained in z-direction for all three materials had a somewhat lower density. Once the laser power was increased even further to increase the density of the 3D printed samples, they started to burn. One factor that might affect this result could be the lower area of the z-direction exposed to the laser that limits use of higher power and by that resulting in final lower density 3D printed parts.

Z-Direction Reflecting Anisotropy in 3D Printed Parts

As mentioned earlier, the print orientation has considerable impact on the mechanical performance of the part and especially on the strength of the part. Some results suggest the emphasized anisotropy in the 3D printed parts due to low flexural modules and strength in the z-direction. In this build direction the interlayer adhesion plays a crucial role determining the overall performance of the parts. In this particular case, all three materials regardless of the densities obtained showed low flexural properties in x direction.

One theory behind the insufficient interlayer adhesion lies in dealing with amorphous materials that only have $T_g$ and require a lot of energy to melt and reach viscosities in the range of less than $10^4$ Pascal-seconds (Pa·s) which will enable good particle coalescence and full densification of the layer. The $T_g$ on the other hand, limits the powder bed temperature in the SLS machine because, above this temperature, the powder starts to soften and becomes sticky. This stickiness impedes the powder flow and ultimately that the whole sintering process. The low bed temperature will cause fast cooling of the molten layer once sintered followed by increase in viscosity as it slowly vitrifies, which will limit good interlayer connection with the next sintered layer resulting in insufficient interlayer adhesion and with that on the z-direction properties. The best option would be to have a molten layer over a molten layer, which gives enough mobility to the polymer chains to interconnect and provide better adhesion.

Section B: Preparation of Partially Crystalline Polyetherimide Powder

Aspects of the present disclosure relate to PEI prepared according to a crystalline formation process. As an example, characteristics of a partially crystalline PEI are described herein. Chemically resistant PEI (CRS) was converted from amorphous to partially crystalline PEI powder. The partially crystalline PEI powder is referred to herein as an induced crystalline powder as the powder is prepared via solvent induced crystallization. The obtained partially crystalline PEI powder is for the first time used in selective laser sintering process and resulted in preparing 3D printed samples with density of 97% in the x and y directions being the highest density obtained for amorphous 3D printed parts. The laser sintering processing window for partially crystalline PEI is such that one can achieve both good dimension control, high density and excellent mechanical performance of 3D printed parts. The processing window for the selected resin (s) is directly related to the powder characteristics (particle size, particle shape, PSD, powderization method) and melt behavior of the same.

Hot Stage Microscopy

Hot stage microscopy measurements were performed with a Olympus BX60 unit as described above.

Particle Size Distribution (PSD)

Figure 10:
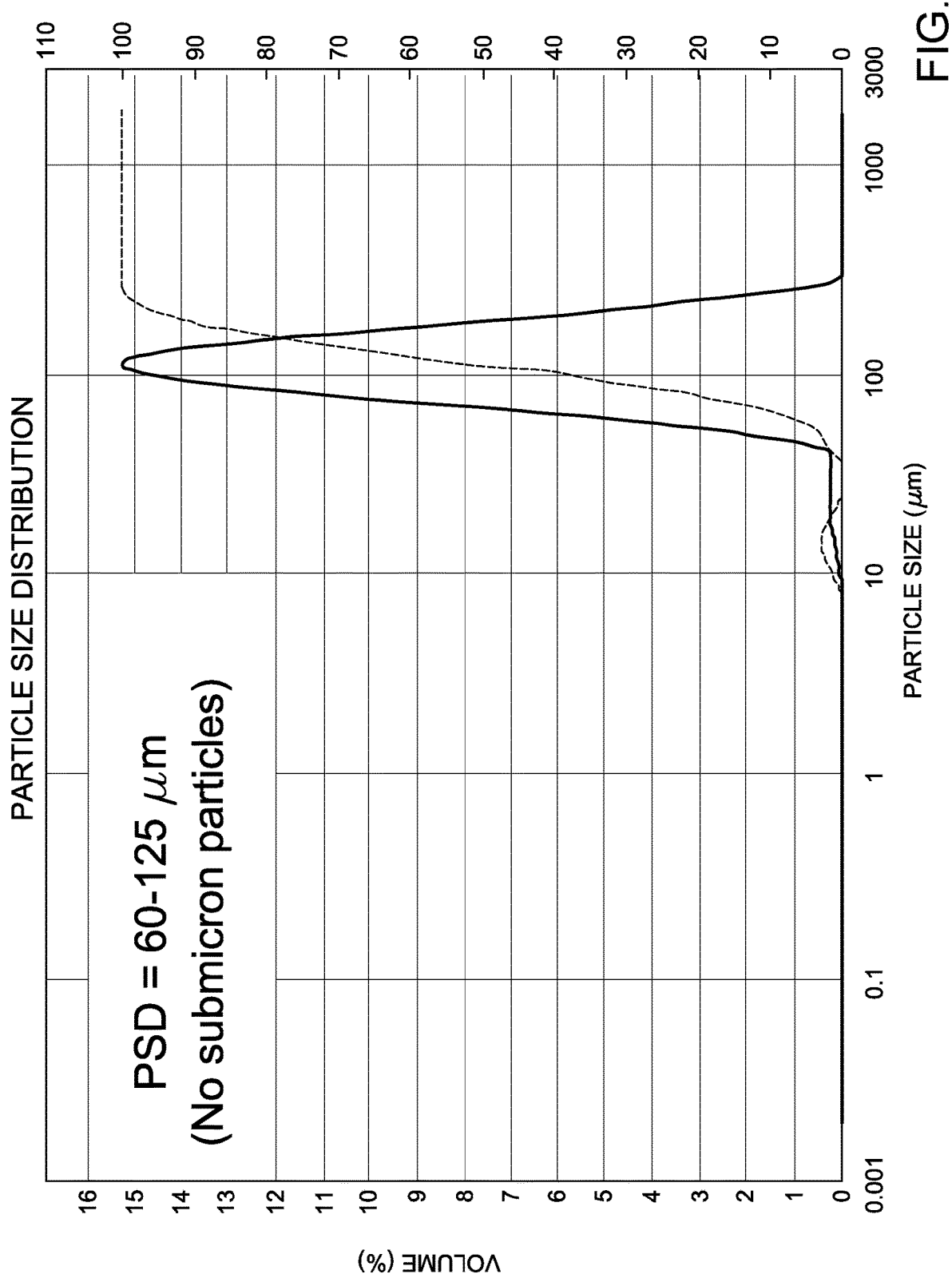
FIG. 10 provides an exemplary particle size distribution for a composition according to the present disclosure (partially crystalline).

Particle size distribution was evaluated as described above. PSD is for a partially crystalline PEI powder is shown in FIG. 10.

Rheology

The viscosity of the material was determined from a frequency sweep rheological experiment using ARES-G2 rheometer from TA Instruments as described above and the Carreau-Yasuda model is used to fit the frequency sweep data to determine the zero-shear viscosity.

Sintering and Secondary Operations

Once the polymer powder is mixed with a flow promoter, one may perform sintering in an SLS machine as described above.

Powderization Process

After selecting a material for laser sintering, the next step is to prepare the powder taking into account few key factors: particle shape, particle size and PSD. One may also select a flow promoter (type and concentration) to improve the powder flow and to prepare a PEI powder formulation (polymer powder and flow promoter) that will enable depositing layers on a powder bed in a smooth and homogeneous manner with good packing density. A flow promoter, as described above, may be useful.

PSD of Partially Crystalline PEI Prepared Via a Pin Mill Grinding Technique

A cryogenic grinding preparation was performed on an amorphous PEI resin. A partially crystalline PEI was prepared via crystallization. For the grinding, the amorphous material was ground three times to achieve better yield of the required particle size, 60-125 micron, on a counter rotating pin disk mill. The PSD the morphology of the prepared PEI powder is shown in FIG. 10. Grinding particulate have a non-spherical shape and their shape is rather irregular (with somewhat smooth edges). The ground particulate has a larger surface area (than its spherical counterpart) and thus might require a larger amount of flow promoter. To conclude, for ground powders the particle size may be between, e.g., 50 and 125 micrometers to achieve powder flow for the same flow promoter content as shown in the example provided in FIG. 10.

DSC of Crystallized CRS PEI (Via Solvent Induced Crystallization)

Figure 11:
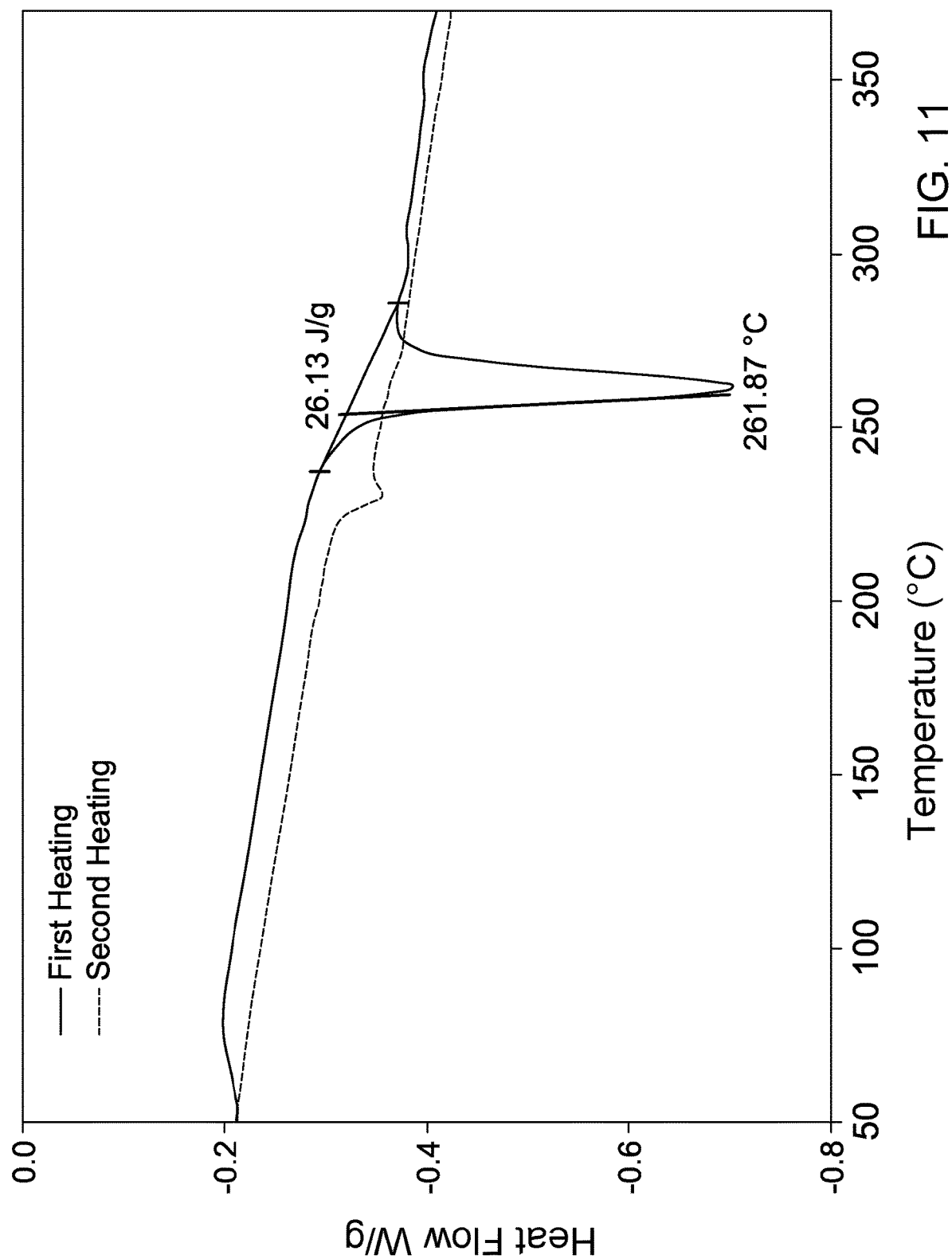
FIG. 11 provides a DSC curve of partially crystalline PEI showing a $T_m$ at 261° C.

After soaking CRS powders in a solvent (e.g., dichloromethane) at a suitable condition (temperature, residence time and mixing conditions), CRS powders will possess some crystallinity. This is seen in a DSC curve with a well-defined solid-melt transition having a melting point ($T_m$) as well as a melting endotherm. The partially crystalline CRS PEI showed a melting peak at 262° C. and a melting enthalpy of about 26 joules per gram (J/g). DSC is presented in FIG. 11

Some illustrative results are shown in Table 4 (FIG. 12). These results are non-limiting and serve only to illustrate the disclosed technology.

As shown above, a CRS PEI material processed according to the present disclosure and then printed into an SLS-made part may exhibit mechanical properties comparable to or even exceeding those of a comparable injection-molded part (CRS PEI, IM). As one example, the CRS PEI, SLS exhibited densities (when printed in the x, y, and z directions) that closely approached the density of an injection molded CRS PEI part. Similarly, parts printed in the x and y direction exhibited a tensile strength and tensile modulus approaching that of an injection-molded CRS PEI part. Flexural strength and flexural modulus for parts printed in the x and y direction also approached the corresponding property for the CRS PEI injection molded part.

Section C: PEI Powder Prepared Via a Grinding Process.

This disclosure provides PEI powder obtained via a grinding approach and used for preparing 3D printed parts using the selective laser sintering process. Grinding, or a ground particulate, may refer to chopping or cutting or other physical means of forming the particulate of the PEI powder. In this disclosure, laser sintering processing windows for amorphous PEI are defined in order to achieve both good dimension control and mechanical performance of 3D printed parts. This material was used to obtain 3D printed parts with high density and excellent dimensional stability, which represent a unique achievement for amorphous resins in general. The mechanical properties are comparable and in some cases better than PA12, as elaborated herein.

Hot Stage Microscopy

Hot stage microscopy measurements were performed with an Olympus BX60 unit as described above.

Particle Size Distribution (PSD)

Particle size distribution was evaluated as described above.

Rheology

The viscosity of the material was determined from a frequency sweep rheological experiment using ARES-G2 rheometer from TA Instruments as described above and the Carreau-Yasuda model is used to fit the frequency sweep data to determine the zero-shear viscosity Sintering and Secondary Operations Once the polymer powder is mixed with a flow promoter one may perform sintering in an SLS machine as described above.

Powderization Process

The powderization process may proceed as described above. Cryogenic and room temperature grinding were performed on an amorphous PEI resin.

Addition of Flow Promoter for Improving Powder Flow

Neat polymeric powders do not always have sufficient powder flowability for SLS processes due to surface forces that are dominant in the small particles, irrespective of the particles' shape. The ability of one powder to flow without flow promoter depends of the polymer type itself and on the morphology of the formed particles during the powderization technique. It should be understood that a flow promoter may be added before or after the polyetherimide is ground.

The flow promoters—which may be present at spherical nanoparticles (or their aggregates)—may be used to improve powder flowability. The flow promotors may cover the surface of micrometer-sized polymer particles and disrupt Van der Waals attraction forces between particles and enable the particles to flow easily and in turn improve the powder flow.

For one evaluation, PEI powders with silica or alumina based flow promotor (0.05-0.2% in weight with respect to polymer weight in these experiments; these loading levels are non-limiting) were mixed in a high shear mixer (2000 rpm for 15-20 min) in order to break down the agglomerates of the flow-promoter and provide homogeneous dispersion of the flow promotor particles onto the polymer particles.

PSD of PEI Powder Prepared Via Grinding Process

A cryogenic grinding preparation was performed on an amorphous PEI resin. The amorphous resin was ground three times to achieve better yield of the required particle size, 60-125 micron, on a counter rotating pin disk mill. The PSD of the exemplary prepared powder is shown in FIG. 9. In some embodiments, melting behavior of the powder may be improved by adding flow promoter, though this may not always be the case. For ground powders, particle size may be between about 50 and about 125 micrometers to achieve good powder flow for the same flow promoter content also shown in FIG. 10.

DSC of Amorphous PEI Powders Prepared Via Grinding Process

Solid-melt transitions can be measured and visualized with differential scanning calorimetry (DSC).

Mechanical Properties & Morphology of 3D Printed Parts

Some illustrative results are shown below. These results are non-limiting and serve only to illustrate the disclosed technology.

TABLE 5

Exemplary results for an SLS part made with a ground PEI prepared according to the present disclosure.

| Properties | | PA2200 ™/ PA, SLS | Ground PEI, SLS | PEI, IM |
|---|---|---|---|---|
| Density | X direction | 0.93 | 1.12 (88%) | 1.27 |
| (g/cm³) | Y direction | | 1.10 (87%) | |
| ISO 1183 | Z direction | | 1.02 (80%) | |
| Tensile Strength | X direction | 48 | 32 (30%) | 105 |
| (MPa) | Y direction | | 54 (51%) | |
| ISO527 | Z direction | | 4.6 (4.4%) | |

TABLE 5-continued

Exemplary results for an SLS part made with a ground PEI prepared according to the present disclosure.

| Properties | | PA2200 ™/ PA, SLS | Ground PEI, SLS | PEI, IM |
|---|---|---|---|---|
| Tensile Modulus | X direction | 1700 | 1434 (45%) | 3200 |
| (MPa) | Y direction | | 1845 (58%) | |
| ISO527 | Z direction | | 977 (31%) | |
| Elongation at | X direction | 24 | 3.8 (6.3%) | 60 |
| Break (%) | Y direction | | 4.1 (6.8%) | |
| ISO527 | Z direction | | 0 (0) | |
| Flexural Strength | X direction | 58 | 83 (52%) | 160 |
| (MPa) | Y direction | | 76 (48%) | |
| ISO178 | Z direction | | 11 (6.9%) | |
| Flexural Modulus | X direction | 1500 | 1019 (31%) | 3300 |
| (MPa) | Y direction | | 1100 (33%) | |
| ISO178 | Z direction | | 579 (18%) | |

Without being bound to any particular theory, the disclosed PEI powder prepared via a grinding process exhibit mechanical properties comparable to and in some cases improved over polyamide-12 (PA2200™ from EOS as shown in Table 5), while also maintaining additive manufacturing processability similar to or improved over PA12 and FR characteristics that are superior to PA12. For this reason, although an additive-manufactured part made with the disclosed compositions may not have exactly the same mechanical properties as an injection-molded PEI (PEI, IM) part, the additive-manufactured part may still have mechanical properties that are similar to those of PA12 while at the same time also having FR characteristics that are superior to those of PA12. Thus, a part additively-manufactured from the disclosed compositions may be substituted for a PA12 part and provide similar mechanical properties as the PA12 while also providing FR properties that are superior to those of PA12.

Exemplary Aspects

Aspect 1A. A composition comprising: a population of polyetherimide particulates having a Dv50 value, for equivalent spherical sizes of the population of polyetherimide particulates, of between about 10 and about 100 micrometers, preferably about 45 micrometers to about 80 micrometers; a Dv10 value, for equivalent spherical sizes of the population of polyetherimide particulates above about 1 micrometer, preferably greater than 1 micrometer to about 45 micrometers, and a Dv90 value, for equivalent spherical sizes of the population of polyetherimide particulates, below about 250 micrometers, preferably from about 80 micrometers to about 125 micrometers, the population of polyetherimide particulates optionally being essentially free of particulates less than about 1 micrometer in diameter, optionally and more preferably being essentially free of particulates less than about 5 micrometers in diameter, optionally and most preferably being essentially free of particulates less than about 10 micrometers in diameter, based on the equivalent spherical size of the polyetherimide particulates, the composition optionally comprising one or more fillers, stabilizers, pigments, reinforcing agents, flame retardants, anti-drip agents, or any combination thereof, and the composition being characterized as having a zero-shear viscosity sufficiently low so as to achieve a coalescence of at least 0.5, and preferably of about 1.0, as characterized by the Frenkel model at a temperature less than 450° C.

Aspect 1B. A composition consisting essentially of: a population of polyetherimide particulates having a Dv50 value, for equivalent spherical sizes of the population of polyetherimide particulates, of between about 10 and about 100 micrometers, preferably about 45 micrometers to about 80 micrometers; a Dv10 value, for equivalent spherical sizes of the population of polyetherimide particulates above about 1 micrometer, preferably greater than 1 micrometer to about 45 micrometers, and a Dv90 value, for equivalent spherical sizes of the population of polyetherimide particulates, below about 250 micrometers, preferably from about 80 micrometers to about 125 micrometers, the population of polyetherimide particulates optionally being essentially free of particulates less than about 1 micrometer in diameter, optionally and more preferably being essentially free of particulates less than about 5 micrometers in diameter, optionally and most preferably being essentially free of particulates less than about 10 micrometers in diameter, based on the equivalent spherical size of the polyetherimide particulates, the composition optionally comprising one or more fillers, stabilizers, pigments, reinforcing agents, flame retardants, anti-drip agents, or any combination thereof, and the composition being characterized as having a zero-shear viscosity sufficiently low so as to achieve a coalescence of at least 0.5, and preferably of about 1.0, as characterized by the Frenkel model at a temperature less than 450° C.

Aspect 1C. A composition consisting of: a population of polyetherimide particulates having a Dv50 value, for equivalent spherical sizes of the population of polyetherimide particulates, of between about 10 and about 100 micrometers, preferably about 45 micrometers to about 80 micrometers; a Dv10 value, for equivalent spherical sizes of the population of polyetherimide particulates above about 1 micrometer, preferably greater than 1 micrometer to about 45 micrometers, and a Dv90 value, for equivalent spherical sizes of the population of polyetherimide particulates, below about 250 micrometers, preferably from about 80 micrometers to about 125 micrometers, the population of polyetherimide particulates optionally being essentially free of particulates less than about 1 micrometer in diameter, optionally and more preferably being essentially free of particulates less than about 5 micrometers in diameter, optionally and most preferably being essentially free of particulates less than about 10 micrometers in diameter, based on the equivalent spherical size of the polyetherimide particulates, the composition optionally comprising one or more fillers, stabilizers, pigments, reinforcing agents, flame retardants, anti-drip agents, or any combination thereof, and the composition being characterized as having a zero-shear viscosity sufficiently low so as to achieve a coalescence of at least 0.5, and preferably of about 1.0, as characterized by the Frenkel model at a temperature less than 450° C.

Aspect 2. The composition of any one of claims 1A-1C, wherein the polyetherimide particulates have a sphericity of greater than 0.8.

Aspect 3. The composition of claim 1, wherein the polyetherimide particulates have a sphericity of greater than 0.95.

Aspect 4. The composition of any of aspects 1A-3, wherein the polyetherimide particulates have an average cross-sectional dimension of from about 1 micrometer to about 200 micrometers.

Aspect 5. The composition of any of aspects 1A-4, wherein the population of polyetherimide particulates are amorphous, at least partially crystalline, or a mixture thereof.

Aspect 6. The composition of any of aspects 1A-5, wherein the composition further comprises a flow promoter in particulate form and wherein the flow promoter is present at from about 0.025 wt % to about 1.0 wt % in weight with respect to polymer weight.

Aspect 7. The composition of any one of claims 1A-5, wherein the population of polyetherimide particulates are converted to at least partially crystalline particulates or are subjected to a particle size exclusion process.

Aspect 8. The composition of any one of claims 1A-5, wherein the population of polyetherimide particulates is at least partially crystalline and wherein the composition further comprises a flow promoter.

Aspect 9. The composition of any of claims 6-8, wherein the flow promoter comprises a metal oxide, preferably fumed silica, fumed aluminum oxide, a hydrated silica, amorphous alumina, a glassy silica, a glassy phosphate, a glassy borate, a glassy oxide, titania, talc, mica, a fumed silica, precipitated silica, kaolin, attapulgite, calcium silicate, alumina, magnesium silicate, or a combination comprising at least one of the foregoing, more preferably fumed silica, alumina, or any combination thereof.

Aspect 10. The composition of any one of claims 6-8, wherein the flow promoter comprises silane and trimethoxyoctyl-reaction products with aluminum oxide.

Aspect 11. The composition of any one of claims 1-10, wherein the polyetherimide particulates are formed from a polyetherimide resin derived from bisphenol A dianhydride, phthalic anhydride and m- or p-phenylene diamine.

Aspect 12. The composition of any of claims 1-11, wherein the population of polyetherimide particulates has a weight-average molecular weight of polyetherimide of from about 30,000 to about 100,000 (per polystyrene standards), preferably from about 30,000 to about 60,000.

Aspect 13. The composition of any of claims 1-12, the composition being characterized as achieving a zero-shear viscosity of less than about $10^4$ Pa·s at a temperature below the lowest degradation temperature of any component of the composition.

Aspect 14. The composition of any of claims 1-13, wherein the composition further comprises a radiation absorbing material having a λ max of from about 200 nm to about 2500 nm.

Aspect 15. The composition of any of claims 1-14, wherein a test bar formed from the composition has a density of from about 75% to about 99% the density of an injection-molded article or test bar formed from a corresponding amorphous polyetherimide, and wherein the test bar is additively manufactured in the x- or y-directions, and wherein at least one of the article's tensile strength, tensile modulus, flexural strength, flexural modulus, or Charpy impact characteristics, is between about 50% and about 100% of the corresponding characteristic in a corresponding injection-molded article.

Aspect 16. The composition of any one of claims 1-14, wherein a test bar formed from the composition is additively manufactured in the x- or y-directions, and wherein at least one of the test bar's tensile strength, tensile modulus, flexural strength, flexural modulus, or Charpy impact characteristics, is between about 75% and about 100% of the corresponding characteristic in a corresponding injection-molded article.

Aspect 17. The composition of any one of claims 1-14, wherein a test bar formed from the composition is additively manufactured in the z-direction, and wherein at least one of the test bar's tensile strength, tensile modulus, elongation at break, flexural strength, flexural modulus, or Charpy impact characteristics, as measured in the z-direction, is greater than about 25%, and more preferably greater than about 50% of the corresponding characteristic in a corresponding additive-manufactured article manufactured in the x- or y-directions.

Aspect 18. The composition of any one of claims 1-14, wherein a test bar formed from the composition is additively manufactured in the x- or y-directions, and wherein at least one of the test bar's tensile strength, tensile modulus, flexural strength, flexural modulus, or Charpy impact characteristics, is between about 75% and about 100% of the corresponding characteristic in a corresponding injection-molded article wherein a test bar formed from the composition is additively manufactured in the z-direction, and wherein at least one of the test bar's tensile strength, tensile modulus, elongation at break, flexural strength, flexural modulus, or Charpy impact characteristics, as measured in the z-direction, is greater than about 25%, and more preferably greater than about 50% of the corresponding characteristic in a corresponding additive-manufactured article manufactured in the x- or y-directions.

Aspect 19. An article formed from a composition according to any one of claims 1-12.

Aspect 20. The article of claim 16, wherein the article is formed according to an additive manufacturing fusing process.

Aspect 21. A method, comprising: depositing a first layer of a composition according to any of claims 1-12 at a working area; irradiating at least a selected portion of the first layer; depositing at least a second layer of the composition at the selected portion of the first layer so as to fuse together at least some of the particulates in the selected portion with the second layer, wherein the irradiating the selected portion of the first layer heats at least the selected portion to the melting onset temperature of the composition, and wherein the irradiating is effected such that the composition attains a zero shear viscosity of about $10^4$ Pa·s or less.

Aspect 22. The method of claim 21, wherein the irradiating is effected by a laser sintering process.

Aspect 23. The method of claim 21, wherein the irradiating is effected by melting via infrared heating.

Aspect 24. A method, comprising: depositing a first layer of a composition according to any of claims 1-12 at a working area; irradiating at least a selected portion of the first layer; depositing at least a second layer of the composition at the selected portion of the first layer so as to sinter together at least some of the particulates in the selected portion with the second layer.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise. As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps. It is to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims that follow, reference will be made to a number of terms which shall be defined herein.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams (g) to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9 to 1.1. Other meanings of "about" may be apparent from the context, such as rounding off, so, for example "about 1" may also mean from 0.5 to 1.4.

As used herein, "$T_m$" refers to the melting point at which a polymer completely loses its orderly arrangement. As used herein, "$T_c$" refers to the crystallization temperature at which a polymer gives off heat to break a crystalline arrangement. The terms "Glass Transition Temperature" or "$T_g$" may be measured using a differential scanning calorimetry method and expressed in degrees Celsius. Molecular weights provided herein are given per polystyrene standards.

The Frenkel model as described herein describes the viscous flow between two identical spherical particles, which can give insight into the sintering kinetics of powder particles. It is used to calculate the kinetics of coalescence of the 2D sintering of two molten powder particles. The Frenkel model may be defined by $$\frac{x}{r} = \left(\frac{3}{2}\frac{yt}{\eta r}\right)^{\frac{1}{2}}$$

wherein, x, r, t, y, and n represent the neck radius, the initial particle radius, the time of sintering, the surface tension, and the viscosity of the liquid, respectively. Where x/r changes from 0 to 1, where 0 describes no coalescence and 1 corresponds to full coalescence. To get high density parts in SLS processes, and thus good mechanical properties, the zero-shear viscosity has to drop sufficiently so that the x/r ratio is above 0.5, preferably close to 1.

Sphericity may be defined as the ratio of the surface area of a sphere of same volume as the given particle to the surface area of the particle: As/Ap. In further aspects, sphericity may be defined by ((6*Vp)/(Dp*Ap)), where Vp is the volume of the particle, Dp is the diameter of the particle and Ap is the surface area of the particle.

Dv10 represents a particle diameter corresponding to 10% cumulative (from 0 to 100%) undersize particle volume distribution, i.e., a value whereby 10% of the particles in the tested sample are smaller than that value.

Dv50 is also known as volume median or volume average particle size. It physically represents that each of the volume of particles greater or smaller than such value represents 50% of the total volume of particles in the distribution. For example, if Dv50=10 micrometers, then 50% of the particles in the sample are larger than 10 micrometers by volume and 50% are smaller than 10 micrometers by volume.

Dv90 represents a particle diameter corresponding to 90% cumulative (from 0 to 100%) undersize particle volume distribution, i.e., a value whereby 90% of the particles in the tested sample are smaller than that value.

Ranges can be expressed herein as from one value (first value) to another value (second value). When such a range is expressed, the range includes in some aspects one or both of the first value and the second value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

Unless otherwise stated to the contrary herein, all test standards are the most recent standard in effect at the time of filing this application.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While typical aspects have been set forth for the purpose of illustration, the foregoing descriptions should not be deemed a limitation on the scope herein. Accordingly, various modifications, adaptations, and alternatives can occur to one skilled in the art without departing from the spirit and scope herein.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composition, comprising:
    a population of polyetherimide particulates having
        a) a Dv50 value, for equivalent spherical sizes of the population of polyetherimide particulates, of 45 micrometers to 80 micrometers;
        b) a Dv10 value, for equivalent spherical sizes of the population of polyetherimide particulates of greater than 1 micrometer to 45 micrometers, and
        c) a Dv90 value, for equivalent spherical sizes of the population of polyetherimide particulates, of about 80 micrometers to 125 micrometers,
    the population of polyetherimide particulates optionally being essentially free of particulates less than about 1 micrometer in diameter, based on the equivalent spherical size of the polyetherimide particulates,
    the composition optionally comprising one or more fillers, stabilizers, pigments, reinforcing agents, flame retardants, anti-drip agents, or any combination thereof, and
    the composition being characterized as having a zero-shear viscosity sufficiently low so as to achieve a coalescence of at least 0.5.

2. The composition of claim 1, wherein the polyetherimide particulates have a sphericity of greater than 0.8.

3. The composition of claim 1, wherein the population of polyetherimide particulates are amorphous, at least partially crystalline, or a mixture thereof.

4. The composition of claim 1, wherein the composition further comprises a flow promoter in particulate form and wherein the flow promoter is present at from about 0.025 wt % to about 1.0 wt % in weight with respect to polymer weight.

5. The composition of claim 1, wherein the population of polyetherimide particulates is at least partially crystalline and wherein the composition further comprises a flow promoter.

6. The composition of claim 4, wherein the flow promoter comprises a metal oxide.

7. The composition of claim 4, wherein the flow promoter comprises silane and trimethoxyoctyl-reaction products with aluminum oxide.

8. The composition of claim 1, wherein the polyetherimide particulates are formed from a polyetherimide resin derived from bisphenol A dianhydride, phthalic anhydride and m- or p-phenylene diamine.

9. The composition of claim 1, wherein the population of polyetherimide particulates has a weight-average molecular weight of polyetherimide of from about 30,000 to about 100,000 (per polystyrene standards).

10. The composition of claim 1, wherein the composition further comprises a radiation absorbing material having a λmax of from about 200 nm to about 2500 nm.

11. The composition of claim 1, wherein a test bar formed from the composition has a density of from about 75% to about 99% the density of an injection-molded article or test bar formed from a corresponding amorphous polyetherimide, and wherein the test bar is additively manufactured in the x- or y-directions, and wherein at least one of the article's tensile strength, tensile modulus, flexural strength, flexural modulus, or Charpy impact characteristics, is between about 50% and about 100% of the corresponding characteristic in a corresponding injection-molded article.

12. The composition of claim 1,
    wherein a test bar formed from the composition is additively manufactured in the x- or y-directions, and wherein at least one of the test bar's tensile strength, tensile modulus, flexural strength, flexural modulus, or Charpy impact characteristics, is between about 75% and about 100% of the corresponding characteristic in a corresponding injection-molded article and
    wherein a test bar formed from the composition is additively manufactured in the z-direction, and wherein at least one of the test bar's tensile strength, tensile modulus, elongation at break, flexural strength, flexural modulus, or Charpy impact characteristics, as measured in the z-direction, is greater than about 25%, of the corresponding characteristic in a corresponding additive-manufactured article manufactured in the x- or y-directions.

13. A method, comprising:
    a. depositing a first layer of a composition at a working area;
        wherein the composition comprises a population of polyetherimide particulates having
        (i) a Dv50 value, for equivalent spherical sizes of the population of polyetherimide particulates, of 45 micrometers to 80 micrometers;
        (ii) a Dv10 value, for equivalent spherical sizes of the population of polyetherimide particulates of greater than 1 micrometer to 45 micrometers, and (iii) a Dv90 value, for equivalent spherical sizes of the population of polyetherimide particulates, of 80 micrometers to 125 micrometers, the population of polyetherimide particulates optionally being essentially free of particulates less than about 1 micrometer in diameter, based on the equivalent spherical size of the polyetherimide particulates, the composition optionally comprising one or more fillers, stabilizers, pigments, reinforcing agents, flame retardants, anti-drip agents, or any combination thereof, and the composition being characterized as having a zero-shear viscosity sufficiently low so as to achieve a coalescence of at least 0.5;

b. irradiating at least a selected portion of the first layer;

c. depositing at least a second layer of the composition at the selected portion of the first layer so as to fuse together at least some of the particulates in the selected portion with the second layer, wherein the irradiating the selected portion of the first layer heats at least the selected portion to the melting onset temperature of the composition, and wherein the irradiating is effected such that the composition attains a zero shear viscosity of about $10^4$ Pa·s or less.

14. The method of claim 13, wherein the irradiating is effected by a laser sintering process.

15. The method of claim 14, wherein the irradiating is effected by melting via infrared heating.

16. A method, comprising:

depositing a first layer of a composition at a working area; wherein the composition comprises a population of polyetherimide particulates having (i) a Dv50 value, for equivalent spherical sizes of the population of polyetherimide particulates, of 45 micrometers to 80 micrometers;

(ii) a Dv10 value, for equivalent spherical sizes of the population of polyetherimide particulates of greater than 1 micrometer to 45 micrometers, and (iii) a Dv90 value, for equivalent spherical sizes of the population of polyetherimide particulates, of 80 micrometers to 125 micrometers, the population of polyetherimide particulates optionally being essentially free of particulates less than about 1 micrometer in diameter, based on the equivalent spherical size of the polyetherimide particulates, the composition optionally comprising one or more fillers, stabilizers, pigments, reinforcing agents, flame retardants, anti-drip agents, or any combination thereof, and the composition being characterized as having a zero-shear viscosity sufficiently low so as to achieve a coalescence of at least 0.5;

irradiating at least a selected portion of the first layer; and depositing at least a second layer of the composition at the selected portion of the first layer so as to sinter together at least some of the particulates in the selected portion with the second layer.

\* \* \* \* \*